United States Patent
Ochiai et al.

(10) Patent No.: US 7,614,576 B2
(45) Date of Patent: Nov. 10, 2009

(54) SPOOL FOR SPINNING REEL

(75) Inventors: Koji Ochiai, Osaka (JP); Takuji Takamatsu, Osaka (JP)

(73) Assignee: Shimano Inc., Osaka (JP)

(*) Notice: Subject to any disclaimer, the term of this patent is extended or adjusted under 35 U.S.C. 154(b) by 25 days.

(21) Appl. No.: 12/110,354

(22) Filed: Apr. 28, 2008

(65) Prior Publication Data
US 2008/0290202 A1 Nov. 27, 2008

(30) Foreign Application Priority Data
May 21, 2007 (JP) .............................. 2007-133833

(51) Int. Cl.
*A01K 89/01* (2006.01)
(52) U.S. Cl. .................... 242/246; 242/322; 242/319
(58) Field of Classification Search ............... 242/246, 242/243, 319, 322
See application file for complete search history.

(56) References Cited

U.S. PATENT DOCUMENTS

| | | | | |
|---|---|---|---|---|
| 6,176,446 B1* | 1/2001 | Sato | ............. | 242/319 |
| 6,598,819 B2* | 7/2003 | Furomoto | ............. | 242/319 |
| 6,679,445 B2* | 1/2004 | Morise et al. | ............. | 242/322 |
| 6,786,442 B2* | 9/2004 | Sugawara | ............. | 242/231 |
| 7,175,121 B2* | 2/2007 | Ikuta, Takeshi | ............. | 242/307 |
| 7,232,087 B2* | 6/2007 | Morise | ............. | 242/244 |
| 7,401,748 B2* | 7/2008 | Kitajima et al. | ............. | 242/322 |

FOREIGN PATENT DOCUMENTS

| | | | |
|---|---|---|---|
| EP | 1269838 A2 * | 1/2003 | |
| EP | 1329157 A | 7/2003 | |
| EP | 1479292 A | 11/2004 | |
| EP | 1712127 A | 10/2006 | |
| JP | H11-196739 A | 7/1999 | |
| JP | 2004105039 A * | 4/2004 | |
| JP | 2004135542 A * | 5/2004 | |
| JP | 2008283931 A * | 11/2008 | |

* cited by examiner

*Primary Examiner*—Emmanuel M Marcelo
(74) *Attorney, Agent, or Firm*—Shinjyu Global IP

(57) ABSTRACT

A spool of a spinning reel includes a support member, a spool body, a drag mechanism, a first sealing member, and a second sealing member. The support member is detachably connected to a spool shaft. The spool body includes a housing recess that is frontally open and rotatably attached to the support member. The drag mechanism decelerates the spool body and includes a front friction portion that has a press washer with an inner peripheral surface opposed to an outer peripheral surface of a front portion of the support member. The press washer contacts a drag regulation member. The housing recess accommodates the friction portion. The first sealing member seals a gap created between the inner peripheral surface of the press washer and the outer peripheral surface of the support member. The second sealing member seals the gap created between the outer peripheral surface of the press washer and the housing recess.

13 Claims, 12 Drawing Sheets

SPOOL FOR SPINNING REEL

CROSS-REFERENCE TO RELATED APPLICATIONS

This application claims priority under 35 U.S.C. § 119 to Japanese Patent Application No. 2007-133833 filed on May 21, 2007. The entire disclosure of Japanese Patent Application No. 2007-133833 is hereby incorporated herein by reference.

BACKGROUND OF THE INVENTION

1. Field of the Invention

The present invention generally relates to a spool. More specifically, the present invention relates to a spool that is detachably connected to a spool shaft of a spinning reel and is configured to reel out a fishing line in the forward direction.

2. Background Information

In order to apply a drag force to a spool, a drag washer of a drag mechanism is attached to the spool of a front drag spinning reel. The drag mechanism prevents the fishing line from being easily cut, even if the load is increased rapidly on the fishing line due to a caught fish. The drag mechanism is disposed between a spool shaft and a spool that is rotatably supported by the spool shaft. The drag force of the drag mechanism is regulated by a drag regulation member that is screwed onto the spool shaft. The drag mechanism includes a plurality of drag washers that are disposed between the drag regulation member and the spool and are non-rotatably provided on the spool shaft or the spool. The drag regulation member is allowed to contact the drag washer. The drag washer is attached to a circular housing recess that is formed in a front portion of the spool.

In this type of drag mechanism, the drag force is applied to the spool by pressing the drag washer toward the spool by rotating the drag regulation member. It is possible to regulate the drag force by regulating the pressing force. In addition, after the drag regulation member is removed from the spool shaft, the spool is allowed to be removed from the spool shaft.

In drag mechanisms that include multiple drag washers, the frictional force varies when the frictional surfaces of the drag washers get wet. Even when the drag regulation member is set to remain in the same position, the drag force varies. In response to this problem, it is has been conventionally known to use a sealing member that is attached to the front of the drag washer between the drag regulation member and the circular recess formed in the front portion of the spool. As a result, water is prevented from entering from the outer peripheral side of the drag regulation member and contacting the frictional plate (see, for example, Japanese Patent Application Publication No. H11-A-196739).

For the purpose of generating sound during operation, a drag regulation member for conventional drag mechanism is made up of two members. The first member is configured to be rotatable with respect to the spool shaft. The second member is configured to be non-rotatable with respect to the spool shaft. Because of this, a gap is generated between these two members. Therefore, even when a sealing member is attached between the drag regulation member and the spool, if water enters the interior of the drag regulation member through the gap, there is a possibility that water will also intrude into the drag washer side along the spool shaft that penetrates the center part of the drag regulation member. In response to this problem, the conventional spool is configured such that a sealing member is disposed not only between the drag regulation member and the spool, but also between the two members of the drag regulation member.

SUMMARY OF THE INVENTION

In view of the above described conventional configuration, it has been discovered that liquid does not easily enter the drag washer when the spool is attached to the spool shaft. Both sealing members, however, are located in the drag regulation member. Therefore, when the drag regulation member is removed from the spool shaft, the drag washer is exposed to the outside. If the spool is removed in this condition, e.g. to be cleaned, liquid is capable of entering the interior of the spool and getting the frictional surface of the drag washer wet. Because of this, it is necessary to completely dry out the wet drag washer before the spool is used again.

One object of the present invention is to successfully prevent liquid from entering into the circular recess formed in the front portion of the spool.

Another objective of the present invention to prevent liquid from contacting the drag washer in the spool to which the drag washer is attached regardless of whether the spool is connected to or disconnected from the spool shaft of the spinning reel.

The foregoing objects can basically be obtained by providing a spool that is detachably coupled to a spinning reel that is configured to reel out fishing line forward by a drag regulation member that is screwed onto a tip of a spool shaft of the spinning reel. The spool of the spinning reel, according to one aspect of the invention, includes a support member, a spool body, a drag mechanism, a first sealing member, and a second sealing member. The support member is a tubular member that is non-rotatably and detachably coupled to a spool shaft. The spool body is a member that is configured to wind fishing line. The spool body includes a first housing recess that has a substantially-circular opening frontward and is rotatably supported by a support member while rearward movement is restricted. The drag mechanism decelerates the spool body and includes a front friction portion. The front friction portion is accommodated in the first housing recess and includes a press washer. The press washer has an inner peripheral surface opposed to an outer peripheral surface of a front portion of the support member and makes contact with the drag regulation member. The first sealing member seals a gap generated between the inner peripheral surface of the press washer and the outer peripheral surface of the support member. The second sealing member seals a gap generated between the outer peripheral surface of the press washer and the first housing recess.

Accordingly, the spool body that the fishing line is allowed to be wound around is attached to the support member while rearward movement thereof is restricted. The front friction portion including the press washer is accommodated in the first housing recess that is formed with an opening frontward of the spool body. When the spool is removed from the spool shaft, the drag regulation member is removed from the spool shaft. Accordingly, the spool body attached to the support member and the front friction portion are removed from the spool shaft together with the support member. If the spool is removed from the spool shaft, a gap that is created between the inner peripheral surface of the press washer at the front outmost position and the outer peripheral surface of the support member is sealed by the first sealing member. A gap generated between the outer peripheral surface of the press washer and the first housing recess is sealed by the second sealing member. Because of this, the inner and outer peripheral surfaces of the press washer located in the front outmost position are both sealed, and thus water does not easily enter the rear of the press washer. Needless to say, this is also true for when the spool is attached to the spool shaft. Because of this, it becomes possible to prevent liquid from entering the drag washer in the spool to which the press washer is attached regardless of attachment or detachment of the spool.

The spool, according to another aspect of the present invention, wherein the front friction portion further includes a single or plurality of front drag washer(s) that is/are configured to be pressed by the press washer. In this case, additional drag washer can be provided. Accordingly, durability of the drag mechanism will be enhanced and reverse rotation during the drag operation will perform smoothly.

The spool, according to yet another aspect of the present invention, wherein the spool body includes a bobbin trunk, front and rear flange portions, and a skirt portion, and the first housing recess is disposed in a front portion of the bobbin trunk. Here, the bobbin trunk is rotatably coupled to the support member and fishing line is allowed to be wound around an outer peripheral surface thereof. The front and rear flanges are formed to have large diameter and are disposed on the front and rear of the bobbin trunk. The skirt portion is formed with a tubular shape that extends rearward from the rear flange portion. In this case, it is possible to prevent intrusion of liquid in a well-known front drag spool regardless of whether the spool is attached or detached.

The spool, according to still another aspect of the present invention, wherein the rear flange portion includes a second housing recess formed with a substantially-circular opening rearward, and the drag mechanism further includes a rear friction portion and a cover member. Here, the rear friction portion has a plurality of rear drag washers that are accommodated in the second housing recess, and the cover member covers the second housing recess from behind. In this case, it is possible to dispose the rear friction portion in the second housing recess of the rear flange portion, the diameter of which is greater than that of the bobbin trunk in which the first housing recess is disposed. Accordingly, friction torque will be increased and thus it is possible to achieve strong drag force.

The spool, according to a further aspect of the present invention, also includes a third sealing member that seals a gap generated between the cover member and the support member. In this case, it is possible to prevent intrusion of liquid through a gap generated between the support member that is positioned on the inner peripheral side of the rear part of the spool body and the cover member. Because of this, even when the spool is laid on its side or upside down and showered clean with water, water does not easily enter the second housing recess.

The spool, according to yet a further aspect of the present invention, also includes a fourth sealing member that seals a gap generated between the cover member and the second housing recess. In this case, it is possible to prevent intrusion of liquid through a gap generated between the cover member positioned on the outer peripheral side of the rear part of the spool body and the second housing recess. Accordingly, even if the spool is immersed in fresh water and cleaned, water does not easily enter the second housing recess.

The spool, according to still a further aspect of the present invention, wherein the spool body is rotatably supported by the support member by means of at least one bearing coupled to the outer peripheral surface of the press washer. In this case, the spool body is rotatably supported by the bearing coupled to the outer peripheral surface of the press washer. Therefore, it is possible to dispose the second sealing member in the vicinity of the bearing. Accordingly, even when the spool rotates during the drag operation, rotational wobbling does not impact on the second sealing member.

The spool, according to another aspect of the present invention, wherein the second sealing member is disposed on the front surface of the bearing. The spool of the spinning reel also includes a retaining member that holds the second sealing member. In this case, it is possible to retain the second bearing by the second sealing member. Thus, it is possible to retain two members by one retaining member.

The spool, according to still another aspect of the present invention, wherein the first housing recess includes a bearing support portion. The bearing is attached to the bearing support portion.

The spool, according to a further aspect of the present invention, also includes a first drag housing portion formed with a diameter less than that of the bearing support portion. The first drag housing is arranged to accommodate the front friction portion. In this case, it is possible to position the bearing by making use of a step between the first drag housing portion and the bearing housing portion.

The spool, according to still a further aspect of the present invention, wherein the bobbin trunk includes a second housing recess that is formed with a substantially-circular opening rearward and where the drag mechanism further includes a rear friction portion that has a single or plurality of rear drag washer(s) that is/are accommodated in the second housing recess. In this case, the rear friction portion is disposed in the second housing recess that is disposed in the interior of the bobbin trunk. Accordingly, it is possible to achieve a light and compact spool.

The spool, according to yet another aspect of the present invention, also includes a fifth sealing member for sealing a gap generated between the rear drag washer(s) and the second housing recess. In this case, it is possible to prevent liquid from entering the rear friction portion even when the second housing recess is formed in the interior of the bobbin trunk. Because of this, even when the spool is laid sideways or upside down and shower cleaned with water, for instance, it becomes further difficult for water to enter the second housing recess.

According to another aspect of the present invention, there is provided a spinning reel that includes a reel unit, a rotor rotatably supported on the reel unit, a spool shaft and a spool movably mounted forward and backward along the spool shaft. The spool includes a support member, a spool body, a drag mechanism, a first sealing member, and a second sealing member. The support member is a tubular member that is non-rotatably and detachably coupled to a spool shaft. The spool body is a member that is configured to wind fishing line. The spool body includes a first housing recess that has a substantially-circular opening frontward and is rotatably supported by a support member while rearward movement is restricted. The drag mechanism decelerates the spool body and includes a front friction portion. The front friction portion is accommodated in the first housing recess and includes a press washer. The press washer has an inner peripheral surface opposed to an outer peripheral surface of a front portion of the support member and makes contact with the drag regulation member. The first sealing member seals a gap generated between the inner peripheral surface of the press washer and the outer peripheral surface of the support member. The second sealing member seals a gap generated between the outer peripheral surface of the press washer and the first housing recess.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

As used herein, the following directional terms "front, rear, forward, rearward, vertical, horizontal, below and transverse" as well as any other similar directional terms refer to those directions of a device equipped with the present invention. Accordingly, these terms, as utilized to describe the present invention should be interpreted relative to a device equipped with the present invention.

Figure 1:
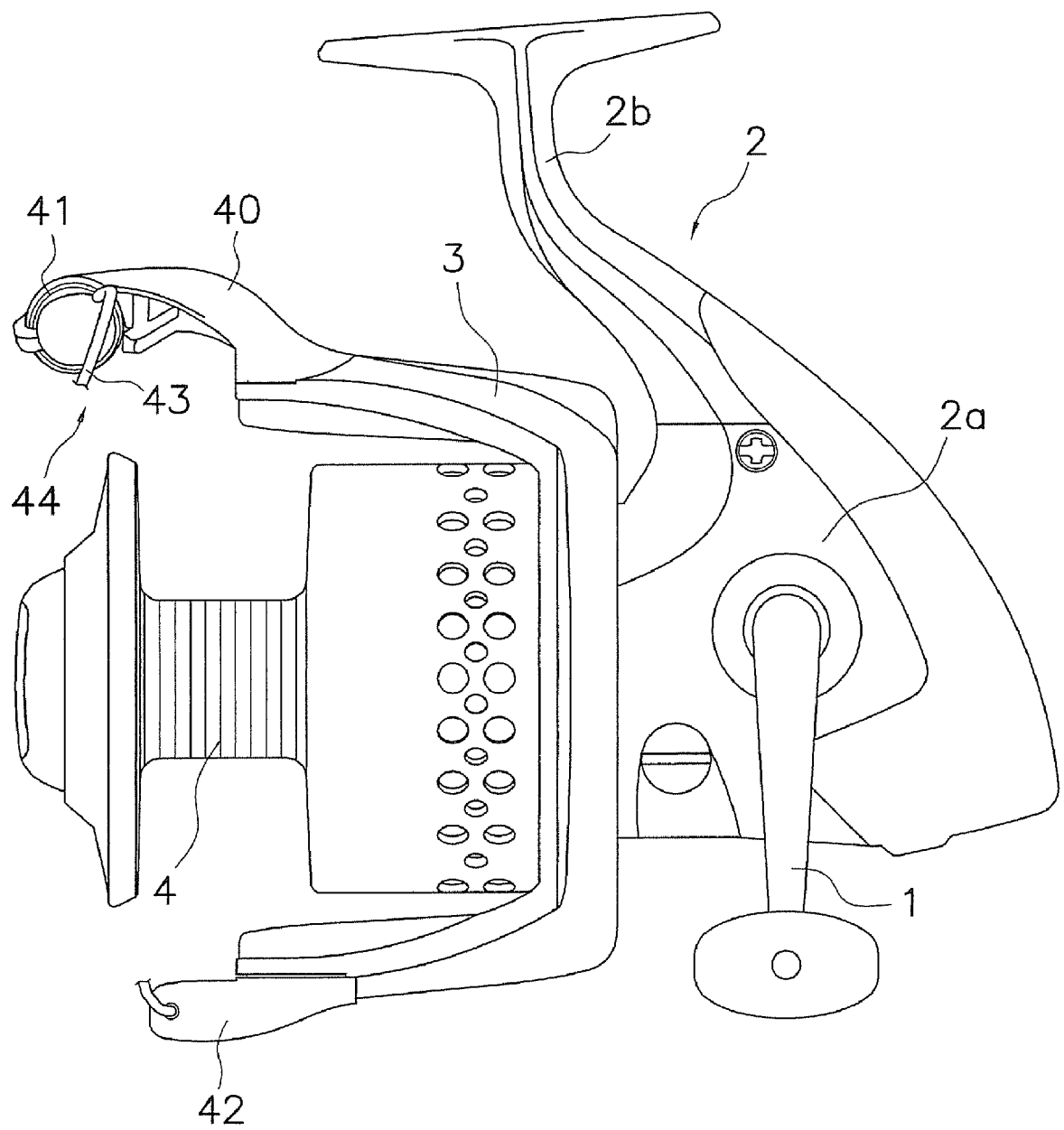
FIG. 1 is a left lateral view of a spinning reel according to a first embodiment of the present invention.

Referring initially to FIG. 1, a spinning reel is illustrated that is equipped with a first embodiment of the present invention. The spinning reel includes a reel unit 2 that rotatably supports a handle 1, a rotor 3, and a spool 4. The rotor 3 is rotatably supported on the front of the reel unit 2. The spool 4 serves to wind fishing line around the outer peripheral surface thereof, and is positioned on the front of the rotor 3 so as to be allowed to move in a front-to-rear direction.

Figure 2:
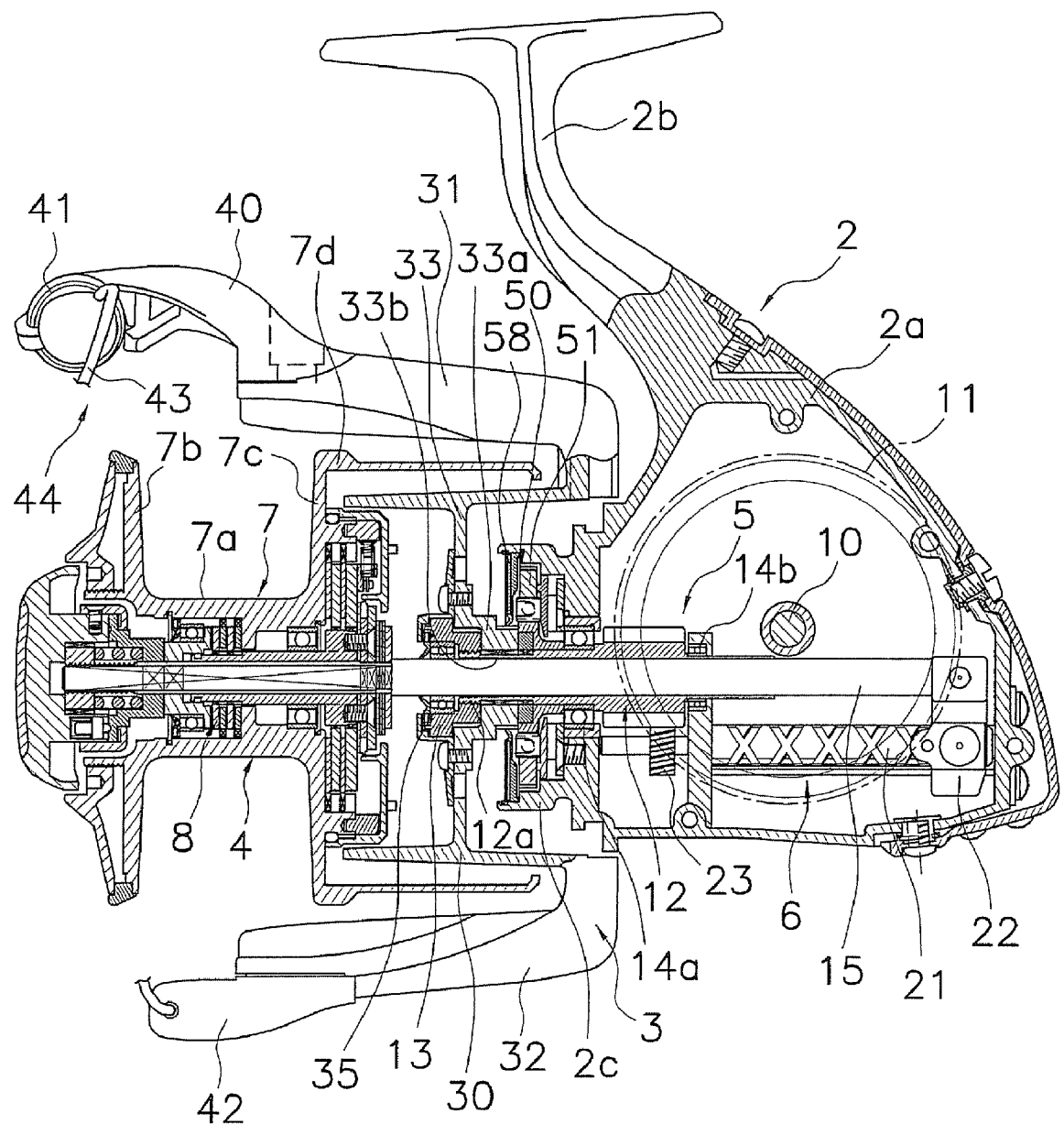
FIG. 2 is a left lateral cross-sectional view of the spinning reel.

The reel unit 2 includes a reel body 2a, and a rod attachment leg 2b that extends diagonally upward and forward from the reel body 2a. As illustrated in FIG. 2, the reel body 2a includes a space in the interior thereof, and a rotor driving mechanism 5 and an oscillating mechanism 6 are accommodated in the space. The rotor driving mechanism 5 rotates the rotor 3 in conjunction with rotation of the handle 1. The oscillation mechanism 6 uniformly winds fishing line by moving the spool 4 back and forth. A tubular portion 2c that projects forward is formed on the front of the reel body 2a.

The rotor drive mechanism 5 includes a face gear 11 and a pinion gear 12. The face gear 11 rotates with a handle shaft 10 to which the handle 1 is coupled, and the pinion gear 12 meshes with the face gear 11. The pinion gear 12 is formed in a tubular shape and is disposed in the front-to-rear direction. A front portion 12a of the pinion gear 12 penetrates the center part of the rotor 3, and is secured to the rotor 3 by a nut 13. The intermediate portion and the rear end portion of the pinion gear 12 in the axial direction are supported by the reel unit 2 through a bearing 14a and a bearing 14b, respectively. A chamfered portion with predetermined length is made up of portions disposed in parallel with each other, and is formed in the front portion 12a of the pinion gear 12. The chamfered portion is formed for non-rotatably coupling the rotor 3 and a one-way clutch (to be described later) for blocking rotation of the rotor 3 in a line-releasing direction to the pinion gear 12.

The oscillation mechanism 6 is a traverse-cam mechanism, and serves to move the spool 4 in the front-to-rear direction by moving a spool shaft 15 coupled to the center part of the spool 4 in the same direction. The oscillation mechanism 6 includes a worm shaft 21 that is disposed in parallel with and below the spool shaft 15, a slider 22 that moves along the warm shaft 21 in the front-to-rear direction, and an intermediate gear 23 that is fixed to the tip of the worm shaft 21. The slider 22 is non-rotatably and axially-movably supported by the reel unit 2. The base end portion of the spool shaft 15 is non-rotatably secured to the slider 22. Accordingly, the spool shaft 15 is also configured to be non-rotatable with respect to the reel unit 2. The intermediate gear 23 meshes with the pinion gear 12 through a speed reduction mechanism (not illustrated in the figure).

As illustrated in FIG. 2, the rotor 3 includes a cylindrical portion 30, and first and second rotor arms 31 and 32 that are laterally provided to the cylindrical portion 30 to be opposed to each other. For example, the cylindrical portion 30 and the two rotor arms 31 and 32 are made of aluminum alloy and are integrally formed.

A front wall 33 is formed on the front part of the cylindrical portion 30, and a boss 33a is formed in the center part of the front wall 33. An oblong shaped through hole 33b, which is non-rotatably interlocked with the chamfered portion 12b, is formed in the center part of the boss 33a, and the front portion 12a of the pinion gear and the spool shaft 15 penetrate the through hole 33b. The nut 13 is disposed on the front of the front wall 33, and a bearing 35 for rotatably supporting the spool shaft 15 is disposed in the interior of the nut 13. A gap is generated between the pinion gear 12 and the spool shaft 15 by the bearing 35. Because of this, even when the spool shaft 15 is deflected, the deflection does not easily impact on rotation of the rotor 3. Thus the rotor 3 will smoothly rotate.

The first rotor arm 31 convexly curves outward and extends forward from the cylindrical portion 30. A connection portion of the first rotor arm 31 with the cylindrical portion 30 curves to extend in the circumferential direction of the cylindrical portion 30. A first bail support member 40 is pivotably mounted to the outer peripheral side of the tip of the first rotor arm 31. A line roller 41 for guiding fishing line to the spool 4 is mounted to the tip of the first bail support member 40.

The second rotor arm 32 convexly curves outward and extends forward from the cylindrical portion 30. The second rotor arm 32 convexly curves outward and extends forward from the cylindrical portion 30, and a connection portion of the second rotor arm 32 with the cylindrical portion 30 curves to extend in the circumference direction of the cylindrical portion 30. A second bail support member 42 is pivotably mounted to the inner peripheral side of the tip of the second rotor arm 32.

A bail 43, which is a wire member curved into an approximately U-shape, is secured between the line roller 41 and the second bail support member 42. The first and second bail support members 40 and 42, the line roller 41, and the bail 43 form a bail arm 44 for guiding fishing line onto the spool 4. The bail arm 44 is allowed to pivot between a line-guiding posture illustrated in FIG. 2 and a line-releasing posture that flips from the line-guiding posture.

An anti-reverse rotation mechanism 50 for constantly blocking reverse rotation of the rotor 3 is disposed in the interior of the tubular portion 2c of the reel body 2a in the inner side of the cylindrical portion 30. The anti-reverse rotation mechanism 50 includes a roller typed one-way clutch 51 in which an inner ring freely rotates.

A sealing plate 58 with a lip for preventing liquid form entering the interior of the reel body 2a is mounted to the cylindrical portion 2c on the front of the one-way clutch 51. The sealing plate 58 is retained by a retaining spring that is bent in a pentagonal shape.

As illustrated in FIG. 2, the spool 4 is disposed between the first rotor arm 31 and the second rotor arm 32 of the rotor 3. The spool 4 is configured to be detachably mounted to a spool shaft 15 that is disposed along the front-to-rear direction.

Figure 3:
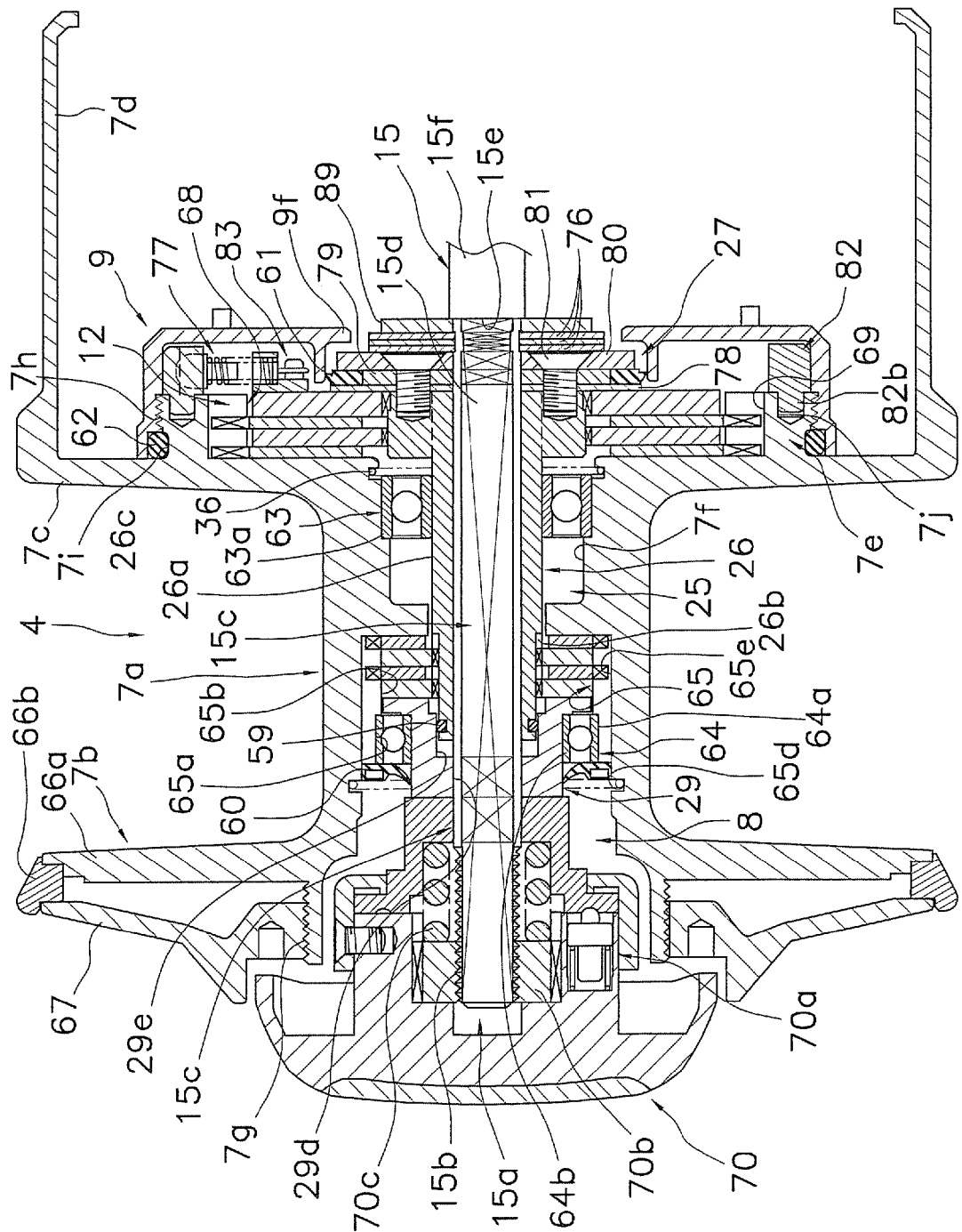
FIG. 3 is an enlarged cross-sectional view of the spool section of the spinning reel.
Figure 4:
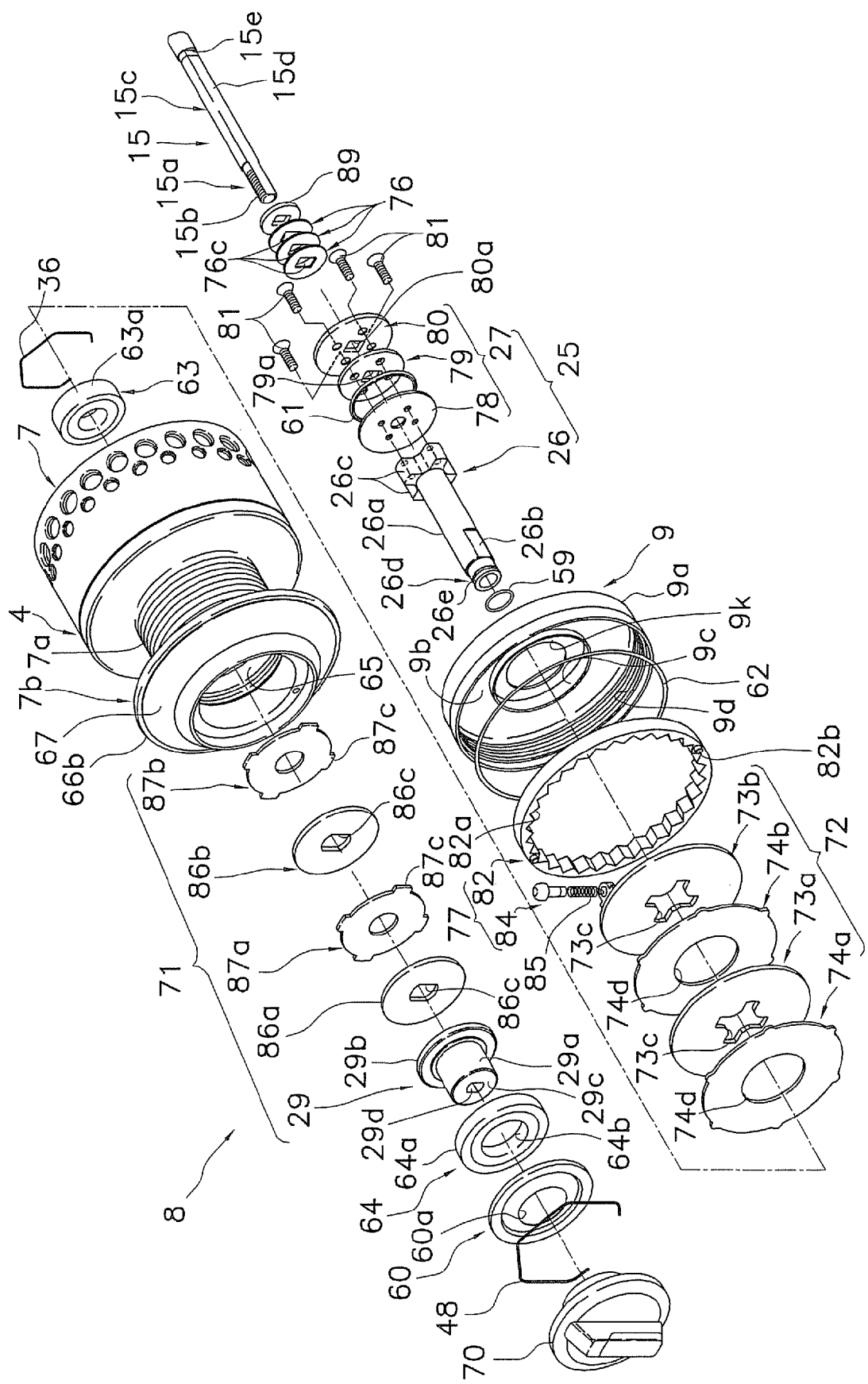
FIG. 4 is an exploded oblique view of a drag mechanism.

As illustrated in FIGS. 3 and 4, the spool shaft 15 is formed to have a diameter that is reduced toward the tip thereof in two phases. A male threaded portion 15b for drag regulation is formed on the outer peripheral surface of the tip side of the first shaft portion 15a. A second shaft portion 15c, which is disposed to be adjacent to the first shaft portion 15a, is formed to have a diameter slightly greater than that of the first shaft portion 15a. An anti-rotation portion 15d, which is made up of surfaces disposed in parallel with each other, are formed on the outer peripheral surface of the first shaft portion 15a and that of the second shaft portion 15c. The anti-rotation portion 15d is formed for non-rotatably coupling a drag mechanism 8 (to be described later) to the spool shaft 15. A third shaft portion 15f on the base end side (right side in FIG. 2) of the spool shaft 15 is formed to have a diameter slightly greater than that of the second shaft portion 15c. Therefore, a step 15e is generated between the second shaft portion 15c and the third shaft portion 15f.

Figure 5:
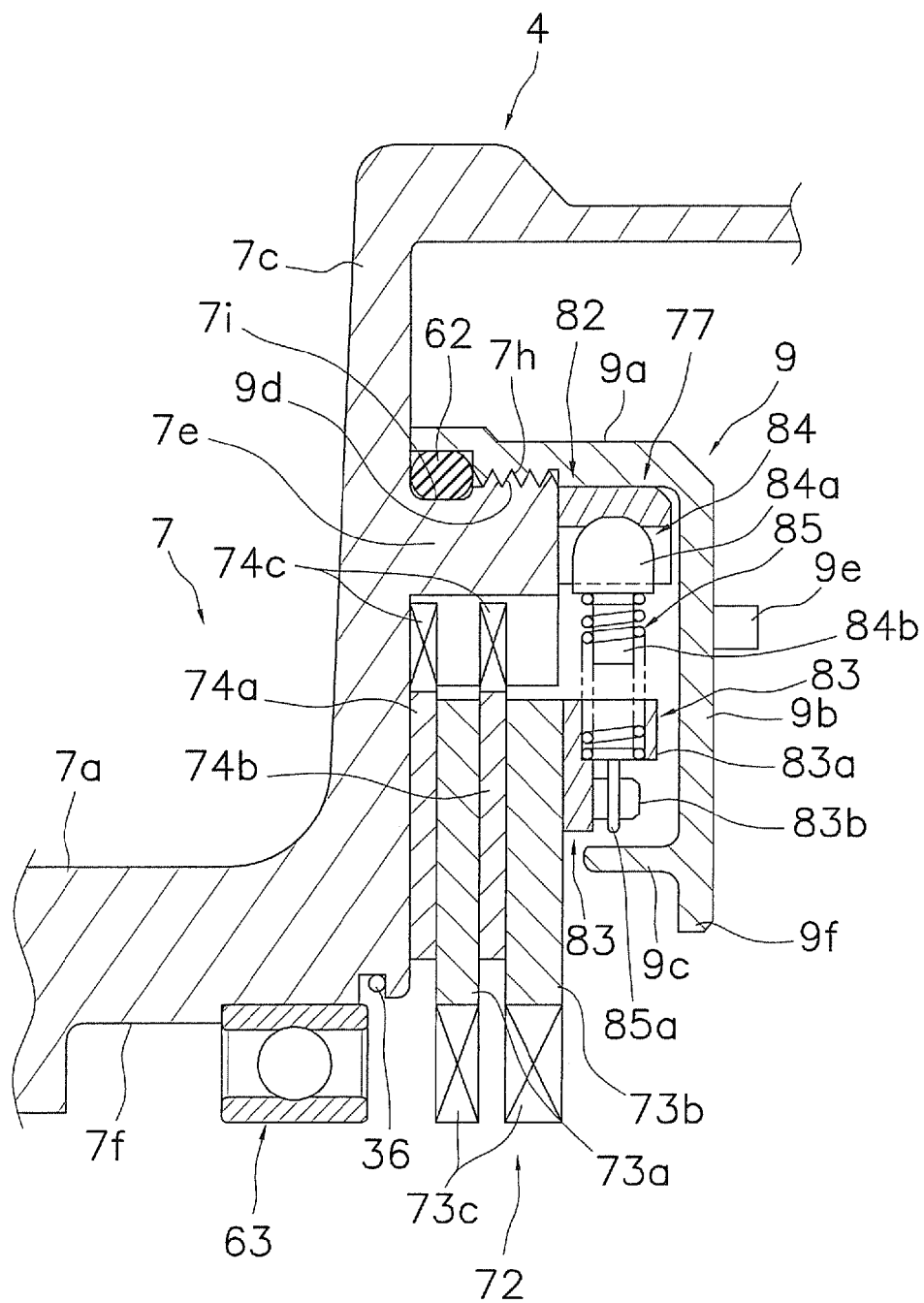
FIG. 5 is an enlarged cross-sectional view of a second friction portion.

As illustrated in FIGS. 3-5, the spool 4 includes a tubular shaped support member 25, a spool body 7 for winding a fishing line, and the drag mechanism 8 for braking the spool body 7. The support member 25 is non-rotatably and detachably mounted to the spool shaft 15. The spool body 7 includes a first housing recess 65. The first housing recess 65 is a substantially circular opening formed in the front portion of the spool body 7. In addition, the spool 4 includes first and second sealing members 59 and 60, and third and fourth sealing members 61 and 62. The first and second sealing members 59 and 60 prevent liquid from entering the first housing recess 65 in which the drag mechanism 8 is located. The third and fourth sealing members 61 and 62 prevent liquid from entering the drag mechanism 8 from the rear of the spool 4 or the rear portion of the spool body 7.

The support member 25 includes a tubular shaped support member main body 26 and a restriction part 27. The restriction part 27 restricts rearward movement of the support body 26. The restriction part 27 also non-rotatably restricts the support body 26 with respect to the spool shaft 15. The support body 26 includes a tubular shaped bearing mount portion 26a, a first interlocking portion 26b, and a second interlocking portion 26c. A first bearing 63 for rotatably supporting the spool body 7 is mounted to the bearing mount portion 26a. The first interlocking portion 26b is disposed on the outer peripheral surface of the front part of the support body 26, and is made up of surfaces that are disposed in parallel with each other for non-rotatably interlocking a first friction portion 71 (example of a front friction portion) (to be described later) of the drag mechanism 8. The second interlocking portion 26c is disposed on the outer peripheral surface of the rear part of the support body 26, and includes four protrusions that protrude outward in the diameter direction for non-rotatably interlocking a second friction portion 72 (to be described later) (example of a rear friction portion) of the drag mechanism 8.

The rear surface of an outer ring 63a of the first bearing 63 is retained by a first retaining member 36 that is formed by bending a metal spring wire. The support body 26 is rotatably mounted and axially movable with respect to the spool shaft 15. A sealing member mount portion 26d with small diameter is formed in the tip of the support body 26. An annular shaped sealing member mount groove 26e is formed in the sealing member mount portion 26d. A first sealing member 59 is mounted to the sealing member mount groove 26e. The first sealing member 59 is an O-ring, for instance, and seals a gap created between the support body 26 and a press washer 29 (to be described later) of the drag mechanism 8.

As illustrated in FIG. 4, the restriction part 27 includes a single washer 78 that is fixed to the rear surface of the support body 26, and two restriction disks 79 and 80. A third sealing member 61 is disposed and supported between the washer 78 and the restriction disk 80. The restriction disk 79 is formed to have a diameter less than that of the restriction disk 80, and the third sealing member 61 is mounted to the outer periphery of the restriction disk 79. The restriction disk 79 includes a substantially rectangular shaped through-hole 79a, which is formed in the center part thereof and is non-rotatably interlocked with an anti-rotation portion 15d of the spool shaft 15. The restriction disk 80 is formed to have a diameter greater than that of the restriction disk 79. The restriction disk 80 includes a substantially rectangular shaped through-hole 80a, which is formed in the center part thereof and is non-rotatably interlocked with the anti-rotation portion 15d of the spool shaft 15. These three members, the washer and restriction disks 78-80, are fixed to the support body 26 by four flat head bolts 81. The four flat head bolts 81 are screwed into the rear end of the support body 26 via the restriction disks 79 and 80. As a result, the support body 26 is configured to be non-rotatable with respect to the spool shaft 15.

In addition, three regulation washers 76, which are made of synthetic resin and are mounted to the rear end of the anti-rotation portion 15d of the spool shaft 15, make contact with the rear surface of the restriction disk 80. The regulation washers 76 serve to regulate a front-to-rear position of the spool 4 in the spool shaft direction. A spool washer 89 for restricting rearward movement of the spool body 7 is mounted to the rear surface of the regulation washer 76 while it is non-rotatably locked to the rearmost end of the anti-rotation portion 15d. The spool washer 89 makes contact with the step 15e of the spool shaft 15 and is prevented from axially moving in the rearward direction. Because of this, the support body 26 is restricted from moving in the rearward direction along the spool shaft. Note that a mount portion for the regulation washers 76, which is formed in the rear end of the anti-rotation portion 15d, is formed to have a diameter slightly less than that of the other portion. The regulation washers 76 are configured to be left on the spool shaft 15 when the spool body 7 is removed from the spool shaft 15 together with the support member 25.

The spool body 7 is a cylindrical member with two (higher and lower) levels, which are formed, for instance, by forging aluminum alloy. The spool body 7 is a member for winding a fishing line thereon. The spool body 7 is rotatably mounted to the support member 25 while rearward movement is restricted. The spool body 7 includes a substantially tubular shaped bobbin trunk 7a for which a fishing line is allowed to be wound on the outer peripheral surface thereof, large-diameter front and rear flange portions 7b and 7c formed on the front and rear of the bobbin trunk 7a, and a tubular shaped skirt portion 7d that extends rearward from the rear flange portion 7c.

The bobbin trunk 7a is rotatably supported by the support member 25 through the first and second bearings 63 and 64.

A first housing recess 65 is formed in the front side of the interior of the bobbin trunk 7a. The first housing recess 65 has a substantially circular opening for accommodating the first friction portion 71 of the drag mechanism 8. The first housing recess 65 includes a bearing support portion 65a and a first drag housing portion 65b. An outer ring 64a of the second bearing 64 is mounted to the bearing support portion 65a. The first drag housing portion 65b has diameter less than that of the bearing support portion 65a. The first friction portion 71 is accommodated in the first drag housing portion 65b. In addition, the first housing recess 65 includes a sealing member mount portion 65c and an annular groove 65d. A second sealing member 60 is mounted to the sealing member mount portion 65c. A second retaining member 48 is provided in the annular groove 65d for retaining the second sealing member 60. The second retaining member 48 is formed by bending a metal spring wire. The second retaining member 48 and the second bearing 64 are located on the front of the bearing support portion 65a.

A plurality of (e.g., four) first interlocking grooves 65e are formed on the inner peripheral surface of the first housing recess 65 for non-rotatably interlocking the first friction portion 71. The plurality of first interlocking grooves 65e are formed in the circumferential direction at predetermined intervals along the axial direction. An annular shaped partially-recessed portion 7f is formed on the rear side surface of the bobbin trunk 7a for reducing weight of the spool 4. The first bearing 63 is mounted to the rear part of the partially-recessed portion 7f.

The front flange portion 7b includes an inner flange portion 66a and an annular shaped outer flange portion 66b. The inner flange portion 66a is integrally formed with the bobbin trunk 7a. The annular shaped outer flange portion 66b is made of a hard material such as hard ceramic or the like and is mounted on the outer periphery of the inner flange portion 66a. The outer flange portion 66b prevents damage and abrasion generated by fishing line released from the spool 4. The outer flange portion 66b is fixed to the inner flange portion 66a by a flange fixing member 67. The flange fixing member 67 is fixed, for example, by a screw or the like, to the outer peripheral surface of a tubular shaped fixing portion 7g. The tubular shaped fixing portion 7g protrudes forward from the bobbin trunk 7a.

The rear flange portion 7c is integrally formed with the bobbin trunk 7a. The diameter of the rear flange portion 7c is slightly greater than that of the front flange portion 7b. A tubular shaped rear drag mount portion 7e is formed on the rear surface of the rear flange portion 7c. More specifically, the tubular shaped rear drag mount portion 7e is formed on the inner peripheral side of the skirt portion 7d so as to be separated from the skirt portion 7d, and protrudes rearward. A second housing recess 68 is formed in the interior of the rear drag mount portion 7e. The second housing recess 68 is a rearward substantially-circular opening. The second friction portion 72 of the drag mechanism 8 is accommodated in the second housing recess 68. A male threaded portion 7h is formed on the outer peripheral surface of the rear drag mount portion 7e. In addition, a plurality of (e.g., four) second interlocking grooves 69 are formed on the inner peripheral surface of the second housing recess 68 for non-rotatably interlocking the second friction portion 72. The second interlocking grooves 69 are formed in the circumferential direction at predetermined intervals along the spool shaft direction.

The skirt portion 7d is integrally formed with the rear flange portion 7c and has a tubular shape. The skirt portion 7d extends rearward from the outer periphery of the rear flange portion 7c. When the extended tip moves to the proceeding end of the spool 4, it is configured to be disposed in a position slightly overlapping with the tip of the cylindrical portion 30 of the rotor 3.

The drag mechanism 8 is a mechanism for applying a drag force to the spool 4. The drag mechanism 8 is mounted between the spool body 7 and the spool shaft 15. The drag mechanism 8 includes the first friction portion 71 that is pressed by a drag regulation member 70. The drag regulation member 70 is disposed at the tip of the spool shaft 15 for manually regulating the drag force. The drag mechanism 8 also includes the second friction portion 72 that is accommodated in the second housing recess 68. A cover member 9 is provided for covering the second housing recess 68 from behind.

As illustrated in FIGS. 3 and 4, the drag regulation member 70 includes a drag regulation sound generation mechanism 70a, a nut 70b, and a coil spring 70c. The drag regulation sound generation mechanism 70a generates a sound during drag regulation. The nut 70b is screwed onto the male threaded portion 15b formed at the tip of the spool shaft 15. The coil spring 70c is provided for increasing/decreasing the drag force in the interior of the drag regulation member 70. The drag regulation member 70 reciprocates the nut 70b with respect to the spool 15 when the drag regulation member 70 is rotated with respect to the spool shaft 15. When the nut 70b is moved, the coil spring 70c is extended/contracted. Accordingly, the pressing force applied to the first friction portion 71 and the second friction portion 72 of the drag mechanism 8 can be varied and the drag force regulated.

As illustrated in FIG. 4, the first friction portion 71 includes a press washer 29, a single or plurality of first drag washer(s) 86a and 86b, and a single or plurality of second drag washer(s) 87a and 87b. The press washer 29 is non-rotatably mounted to the spool shaft 15. The first drag washer(s) 86a and 86b is/are non-rotatable with respect to the support body 26. The second drag washer(s) 87a and 87b is/are integrally rotatable with respect to the bobbin trunk 7a.

The press washer 29 is disposed between the first drag washer 86a and the drag regulation member 70. The press washer 29 is configured to make contact with the drag regulation member 70. The press washer 29 includes an opposing tubular portion 29a and a brim portion 29b with large diameter. The opposing tubular portion 29a includes an inner peripheral surface 29e that is opposed to the sealing member mount portion 26d disposed on the outer peripheral surface of the front part of the support body 26. The brim portion 29b is disposed on the rear part of the press washer 29. The brim portion 29b is configured to make contact with the first drag washer 86a. A press portion 29c, which makes contact with the rear surface of the drag regulation member 70 and is pressed thereby, is formed on the front end of the opposing tubular portion 29a. An elongated hole 29d is formed on the inner peripheral surface of the press portion 29c. The elongated hole 29d is engaged with the anti-rotation portion 15d of the spool shaft 15. Because of this, the press washer 29 is non-rotatably and axially-movably mounted to the spool shaft 15.

An inner ring 64b of the second bearing 64 is mounted on the outer peripheral surface of the opposing tubular portion 29a. The second bearing 64 includes the outer ring 64a that is mounted to the bearing support portion 65a of the first housing recess 65. A second sealing member 60 is mounted to the front of the second bearing 64 and makes contact with the second bearing 64.

The second sealing member 60 is a washer shaped member that can be made of any elastic material but nitrile rubber or urethane rubber is preferred. The second sealing member 60 includes a tapered lip 60a that slopes forward on the tip thereof. The base end of the second sealing member 60 is mounted to the sealing member mount portion 65c of the first housing recess 65. The lip 60a makes contact with the outer peripheral surface of the opposing tubular portion 29a. Because of this, the second sealing member 60 seals a gap created between the outer peripheral surface of the opposing tubular portion 29a and the first housing recess 65. The second sealing member 60 and the second bearing 64 are kept together by the second retaining member 48.

The inner peripheral surface of the opposing tubular portion 29a excluding the press portion 29c is formed to have a diameter greater than that of the elongated hole 29d. The inner peripheral surface of the opposing tubular portion 29a is opposed to the sealing member mount portion 26d of the support body 26. The inner peripheral surface thereof is allowed to make contact with the first sealing member 59. Because of this, the first sealing member 59 seals a gap created between the support member 25 and the outer peripheral surface of the opposing tubular portion 29a.

The first and second drag washers 86a and 86b, and 87a and 87b correspond to a front drag washer, and are pressed by the press washer 29. The first drag washers 86a and 86b, and the second drag washers 87a and 87b are alternately disposed to each other. The first drag washers 86a and 86b can be made of any suitable material but a stainless alloy, or the like, is preferred. An elongated through hole 86c is forms the inner periphery of the first drag washers 86a and 86b. The elongated through hole 86c is non-rotatably interlocked with the first interlocking portion 26b of the support body 26. As a result of this, the first drag washers 86a and 86b are configured to be non-rotatable with respect to the spool shaft 15.

A plurality of (e.g., four) tabs 87c are formed to protrude in the radial direction. The tabs 87c are engaged with the first interlocking groove 65e formed in the first housing recess 65 and are disposed on the outer periphery of the second drag washers 87a and 87b at predetermined intervals in the circumferential direction. As such, the second drag washers 87a and 87b are configured to be non-rotatable with respect to the spool body 7 and rotatable with respect to the support body 26. The second drag washers 87a and 87b can be made from, e.g., carbon cloth. The second drag washer 87b is allowed to make contact with the wall part of the first housing recess 65, and presses the spool body 7 rearward.

The second friction portion 72 includes third drag washers 73a and 73b, and fourth drag washers 74a and 74b. The third drag washers 73a and 73b are non-rotatable with respect to the spool shaft 15. The fourth drag washers 74a and 74b are allowed to be pressed together with the third drag washers 73a and 73b and are non-rotatable with respect to the spool body 7. These third and fourth drag washers 73a and 73b, and 74a and 74b correspond to a rear drag washer, and are pressed by the press washer 29 through the spool body 7.

The third drag washers 73a and 73b and the fourth drag washers 74a and 74b are disposed in an alternating manner with respect to each other. The fourth drag washer 74a makes contact with the rear surface of the rear flange portion 7c of the spool body 7. In addition, the second friction portion 72 is restricted from moving rearward in the spool shaft direction by the restriction part 27. The second friction portion 72 is covered with the cover member 9, and thus liquid is prevented from entering the interior thereof from behind by the third and fourth sealing members 61 and 62.

The third drag washers 73a and 73b can be made of any suitable material but a stainless alloy, or the like, is preferred. The third drag washers 73a and 73b include a cross shaped interlocking hole 73c in the center part thereof. The interlocking hole 73 is non-rotatably interlocked with the second interlocking portion 26c formed in the support member main body 26. The third drag washers 73a and 73b are non-rotatable with respect to the spool shaft 15 through the support body 26. The spool shaft 15 is also non-rotatable with respect to the reel unit 2. Therefore, the third drag washers 73a and 73b are configured to be non-rotatable with respect to the reel unit 2. The third drag washer 73b, which is disposed in the rear most position, makes contact with the restriction part 27, and is thus restricted from moving rearward. A pin mount portion 83 is fixed on the rear surface of the third drag washer 73b. A sound generating pin 84 (to be described later) is mounted to the pin mount portion 83.

As illustrated in FIG. 5, the pin mount portion 83 includes a spring mount portion 83a and a spring interlocking pin 83b. A coil spring shaped member 85 is mounted to the spring mount portion 83a. The sound generating pin 84 is mounted to one end of the coil spring shaped member 85. The base end of the coil spring member 85 is interlocked with the spring interlocking pin 83b.

As illustrated in FIGS. 3-5, the fourth drag washers 74a and 74b are, for instance, made of carbon cloth. The fourth drag washers 74a and 74b create the drag force by rotating relative to the third drag washers 73a and 73b. A plurality of (e.g., six) tabs 74c are formed to protrude in the radial direction. The plurality of tabs 74c are disposed on the outer periphery of the fourth drag washers 74a and 74b at predetermined intervals. A through hole 74d is formed in the inner periphery of the fourth drag washers 74a and 74b. The second interlocking portion 26c is not engaged with but penetrate the through hole 74d. Because of this, the fourth drag washers 74a and 74b are configured to be non-rotatable with respect to the spool body 7.

A drag sound generation mechanism 77 that is configured to generate a sound during drag operation is disposed on the rear surface of the drag washer 73b. The drag sound generation mechanism 77 includes a sound generation disk 82 and the sound generation pin 84. The sound generation disk 82 is mounted on the rear end surface of the rear drag mount portion 7e. The sound generation pin 84 is pivotally mounted to the pin mount portion 83 of the third drag washer 73b through the coil spring shaped member 85.

The sound generation disk 82 is a ring shaped member made of metal. The sound generation disk 82 includes a concavo-convex portion 82a on the inner peripheral surface thereof. The concavo-convex portion 82a has a plurality of pyramidal convexo concaves for generating a sound. In addition, the sound generating disk 82 includes a pair of engagement pins 82b on the front end surface thereof. The engagement pins 82b are engaged with a pair of mount holes 7j that are formed on the rear end surface of the rear drag mount portion 7e. Because of this, the sound generation disk 82 rotates with the spool body 7. The sound generation disk 82 is retained by the cover member 9 and is mounted to the rear drag mount portion 7e such that a clearance is created between the mount holes 7j and the engagement pins 82b. As a result, the sound generation disk 82 is pivotably mounted to the rear drag mount portion 7e.

The sound generating pin 84 includes a head portion 84a that contacts the concavo-convex portion 82a. The shaft portion 84b has a diameter less than that of the head portion 84a. The shaft portion 84b is inserted into the interior of the tip of the coil spring shaped member 85 and is fixed in the position. The base end of the spring member 85 is interlocked with the spring interlocking pin 83b. A front side portion of the spring member 85, excluding the base end, is mounted in the interior of the spring mount portion 83a. Because of this, when the spool body 7 rotates, the sound generation pin 84 repeatedly hits the concavo-convex portion 82a. The sound generation pin 84 then vibrates in the rotational direction of the spool body 7 while it is mounted to the spring member 85. Here, the sound generation disk 82 is mounted to the rear drag mount portion 74 such that a clearance is created between the mount holes 7j and the engagement pins 82b. Accordingly, the sound generation disk 82 also vibrates and generates a crisp sound.

The cover member 9 is provided for detaching/reattaching the second friction portion 72 and the support member 25 together with the spool body 7, while the cover member 9 covers the second friction portion 72. When the drag regulation member 70 is removed from the spool shaft 15, then the spool body 7 and the support member 25 can be removed together from the spool shaft 15. As illustrated in FIG. 5, the cover member 9 includes a first cylindrical portion 9a that is disposed on the outer periphery of the rear drag mount portion 7e, a disk portion 9b that extends inward from the first cylindrical portion 9a and is disposed behind the first friction portion 71, and a second cylindrical portion 9c that extends forward from an intermediate part of the disk portion 9b.

A female threaded portion 9d is formed on the inner peripheral surface of the first cylindrical portion 9a and is screwed onto the male threaded portion 7h that is formed on the outer peripheral surface of the rear drag mount portion 7e. The fourth sealing member 62 is mounted between the tip side of the female threaded portion 9d and the outer periphery of the rear drag housing recess 7e. The fourth sealing member 62 is mounted to the sealing member mount groove 7i that is formed on the outer peripheral surface of the rear drag housing portion 7e. A tool interlocking pin 9e is used for screwing the cover member 9 onto the rear drag mount portion 7e. The tool interlocking pin 9e is formed on the rear surface of the disk portion 9b and protrudes rearward. As illustrated in FIG. 3, an inner peripheral portion 9f of the disk portion 9b is arranged in a position to overlap the restriction disk 80 in the radial direction. The inner peripheral portion 9f is configured to make contact with and press the restriction disk 80 when the drag regulation member 70 is removed. The spool 4 can then be removed from the spool shaft 15. Because of this, both of the support member 25 and the spool body 7 can be removed from the spool shaft 15.

The tip of the third sealing member 61 that is mounted to the restriction disk 79 makes contact with the inner peripheral surface of the second cylindrical portion 9c. A gap is created between the outer peripheral surface of the cover member 9 and the skirt portion 7d. The tip of the cylindrical portion 30 of the rotor 3 is allowed to be disposed in the gap. Because of this, it is possible to position the spool 4 to be close to the reel unit 2 when the spool 4 moves backward. Thus, it is possible to keep the front-to-rear length of the reel compact.

The fourth sealing member 62 is made up of an O-ring, and seals a gap created between the outer periphery of the cover member 9 and the rear drag mount portion 7e. Thus, the fourth sealing member 62 prevents liquid from entering the second friction portion 72 from the outer periphery of the cover member 9. The third sealing member 61 is a sealing member that has a lip on the tip thereof, and the lip is formed so as to slope rearward. The third sealing member 61 seals a gap created between the inner periphery of the cover member 9 and the support member 25, and prevents liquid from entering the second friction portion 72 from the inner periphery of the cover member 9. As described above, the second friction portion 72 is sealed by the third and fourth sealing members 61 and 62. The first friction portion 71 is also sealed by the first and second sealing members 59 and 60. Accordingly, even when the spool body 7 and the support member 25 are removed together from the spool shaft 15, liquid does not easily enter the first friction portion 71 and the second friction portion 72. Because of this, when the spool 4 is removed and cleaned with water, the drag force is not easily varied, even when the spool 4 is in the wet condition.

The drag force is regulated before fishing is performed and depending on the size and/or species of fish sought after. When the drag force is regulated, an appropriate length of fishing line is reeled out, and a weight corresponding to a target fish is attached to the tip of fishing line. Then, the drag force is set to a predetermined level by rotating the drag regulation member 70. Whether the drag is operating or not is confirmed by rotating the handle 1. For example, when the drag regulation member 70 is turned in the clockwise direction, the drag regulation member 70 is moved rearward by the nut 70b that is screwed onto the spool shaft 15, and the press washer 29 is pressed through the coil spring 70c. The pressing force is transmitted to the first friction portion 71 and to the second friction portion 72 through the spool body 7. As a result, the drag force will increase. Here, a light click sound is created by the drag regulation sound generation mechanism 70a. In this case, the second friction portion 72 is arranged in a comparatively large space that is formed in the rear part of the spool body 7. Therefore, it is possible to achieve large drag force even in a deep groove type spool 4 in which the bobbin trunk 7a is formed to have small diameter.

When casting is performed, the bail arm 44 is flipped over to the line-releasing posture. Thus, the first bail support member 40 and the second bail support member 42 pivot. A fishing rod is cast while fishing line is hooked by the index finger of the hand of a person holding the fishing rod. Accordingly, the fishing line is released with high momentum due to the weight of the tackle. When the handle 1 is rotated in the line-winding direction after the tackle is splashed down, the rotor 3 is rotated in the line-winding direction by the rotor drive mechanism 5. When the rotor 3 is rotated, releasing of the fishing line is stopped because the bail arm 44 is returned to the line-winding position by a bail tripping mechanism (not illustrated in the figure) and reverse rotation of the rotor 3 is being prevented.

When the fishing line is wound, the handle 1 is rotated in the line-winding direction. Accordingly, rotation is transmitted to the rotor 3 via the face gear 11 and the pinion gear 12, and thus the rotor 3 is rotated. When the rotor 3 is rotated, the fishing line guided by the line roller 41 is wound around the spool 4. Here, when a deep groove type spool 4 is used, which includes a bobbin trunk 7a with diameter less than that of the front and rear flanges 7b and 7c, it is possible to maintain a small diameter of the entire spool so as to increase the amount of fishing line that can be wound thereon.

When fish bite the bait of the tackle, the rotor 3 is going to reversely rotate in the line-releasing direction. However, reverse rotation of the pinion gear 12 is prevented by the anti-reverse rotation mechanism 50. Accordingly, the rotor 3, which is non-rotatably coupled to the pinion gear 12, does not reversely rotate. In this case, a coupling member, which is non-rotatably coupled to the rotor 3 through the pinion gear 12, is going to reversely rotate in the line-releasing direction. However, when an inner ring main body that is interlocked with the coupling member is going to reversely rotate, a roller bites the cam surface that is formed in an outer ring, and the inner ring main body is secured to the outer ring that is non-rotatably interlocked with the reel body 2a. Thus, reverse rotation of the inner ring main body is prevented. As a result, reverse rotation of the rotor 3 is prevented.

When the fishing line is vigorously pulled by a fish, the drag mechanism 8 may be used. When the drag mechanism 8 is in use, sliding is generated among the third drag washer 73a and 73b and the fourth drag washers 74a and 74b of the second friction portion 72, and the first drag washers 86a and 86b and the second drag washers 87a and 87b of the first friction portion 71, respectively. Accordingly, the fishing line is released with the set drag force.

Figure 6:
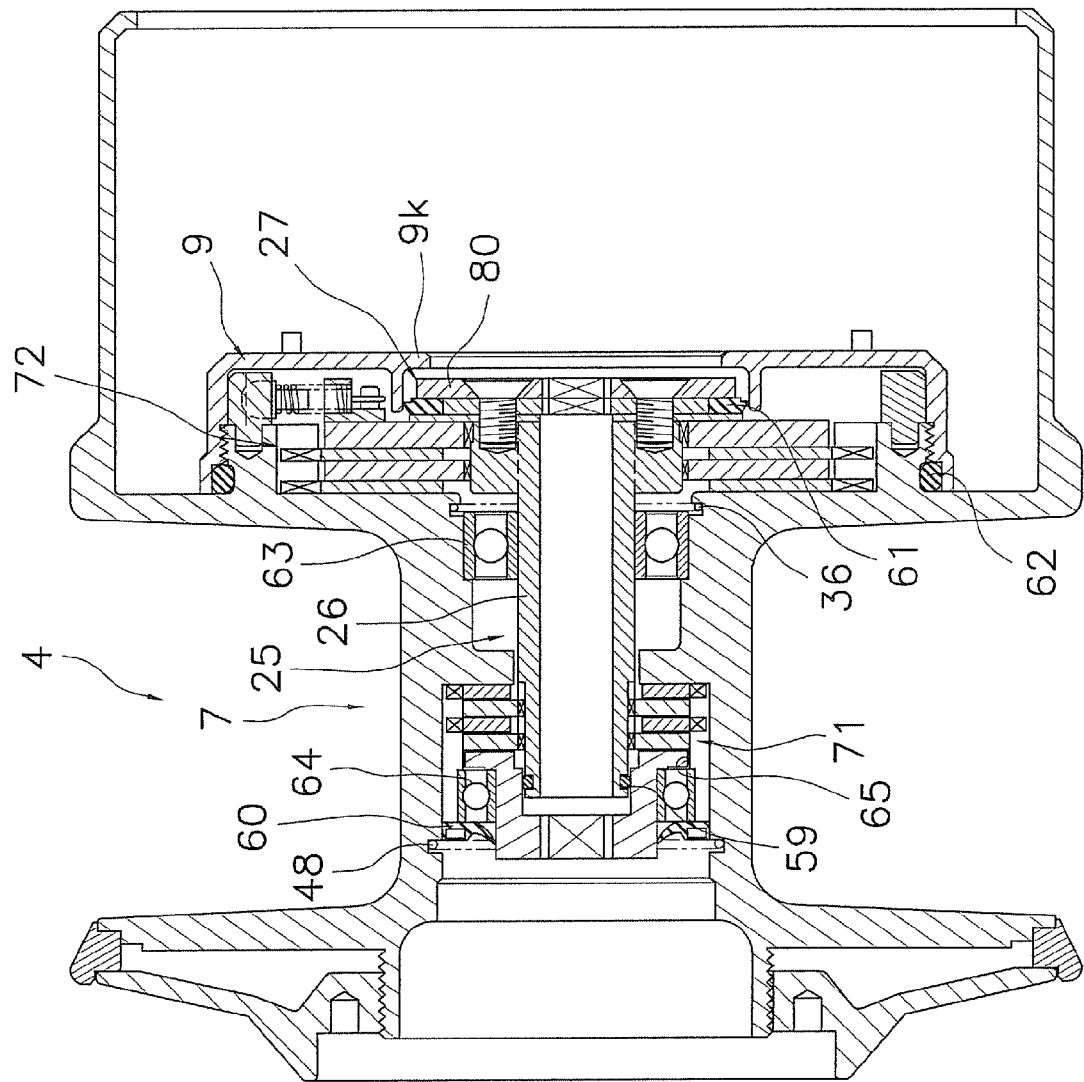
FIG. 6 is an enlarged cross-section view of a removed spool.

When the spool 4 is removed from the spool shaft 15, the drag regulation member 70 is turned in the counter-clockwise direction. Accordingly, the drag regulation member 70 can be removed from the spool shaft 15, and it is possible to remove the spool body 7 and the support member 25 from the spool shaft 15 as illustrated in FIG. 6. In this case, these members are removed from the spool shaft 15 while the first friction portion 71 that is disposed on the rear side thereof is left in the first housing recess 65. This is because the second sealing member 60 and the second bearing 64 are retained by the second retaining member 48. In addition, the second friction portion 72 is covered with the cover member 9 that is mounted to the rear flange portion 7c. Therefore, the second friction portion 72 is removed from the spool shaft 15 together with the first bearing 63 that is retained by the first retaining member 36. Furthermore, the support member 25 can be removed from the spool shaft 15 because the restriction disk 80 is pressed by the inner peripheral portion 9f of the cover member 9. As described above, it is possible to integrally detach/reattach the drag mechanism 8 with the spool body 7. In addition, even when the drag mechanism 8 is removed from the spool shaft 15, the front and the rear of the first and second friction portions 71 and 72 are arranged to remain sealed by the four sealing members 59-62. Therefore, the first and second friction portions 71 and 72 are reliably sealed even in a state when the spool 4 is removed from the spool shaft 15. Because of this, regardless of detachment/reattachment of the spool 4, liquid is prevented from entering the drag washers 74a, 74b, 86a, and 86b in the spool 4 to which the drag washers 74a, 74b, 86a, and 86b are mounted.

Modified Example of First Embodiment

Figure 7:
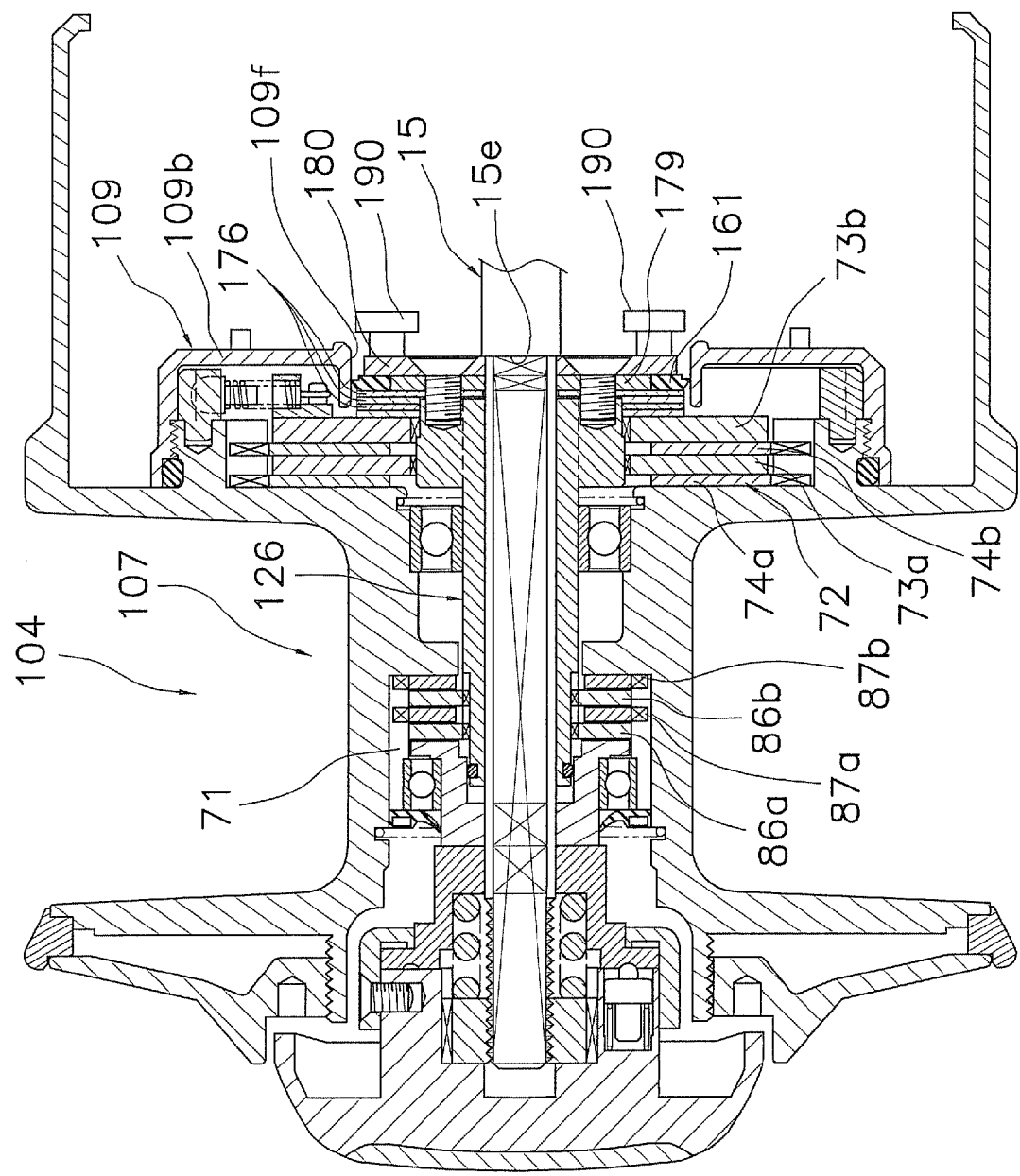
FIG. 7 is a view of a modified example of the first embodiment, which corresponds to FIG. 3.

In the above described first embodiment, for the purpose of easily regulating the position of the spool 4 in the front-to-rear direction, the three regulation washers 76 are configured to be left on the spool shaft 15 when the spool 4 is removed from the spool shaft 15. However, as illustrated in FIG. 7, the three regulation washers 176 are disposed on the front of a restriction disk 179 to which a third sealing member 161 is mounted as illustrated in FIG. 7. The regulation washers 176 may be configured to be removed from the spool shaft 15 together with a spool 104. In addition, an inner periphery 109f of a disk portion 109b of a cover member 109 is not formed to protrude. The inner periphery 109f is arranged not to overlap a restriction disk 180 in the radial direction.

The restriction disk 180, which is fixed to a support member main body 126 by a screw member, is disposed on the rearmost of the spool 104. The restriction disk 180 makes contact with the step 15e of the spool shaft 15 and is thus restricted to move rearward. Therefore, the spool washer 89 is not provided for the modified example. For instance, two stepped bolts 190 are disposed upright on the rear surface of the restriction disk 180 for the purpose of easily pulling the support body 126. The restriction disk 180 is fixed to the support body 126 by the screw member. The regulation washers 176 are used for regulating the position of the spool 104 in the front-to-rear direction. It is possible to expose the regulation washer 176 to the outside and it is also possible to change the number of the regulation washer 176 by pulling the restriction disk 180 by making use of the stepped bolt 190 in a state where the spool 104 is removed from the spool shaft 15.

In the configuration of the modified example, the inner periphery 109f of the cover member 109 does not make contact with the restriction disk 180. However, the support body 126 can be removed from the spool shaft 15 together with a spool body 107 when the drag washers 86a, 86b, 87a, 87b, 73a, 73b, 74a, 74b of the first friction portion 71 and the second friction portion 72 are inclined and collide with each other.

Second Embodiment

Figure 8:
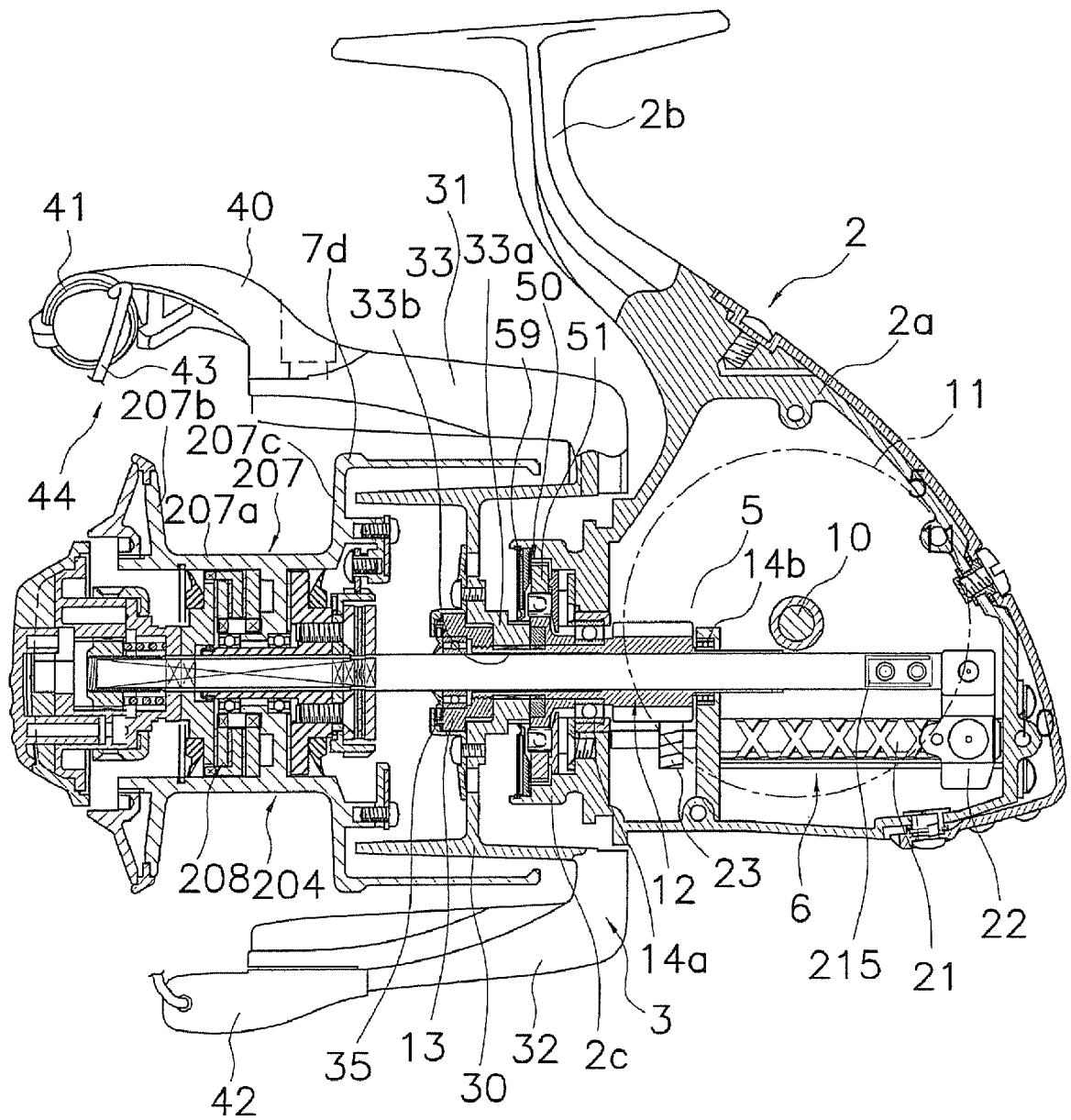
FIG. 8 is a left lateral view of a spinning reel to which a second embodiment of the present invention is applied.
Figure 9:
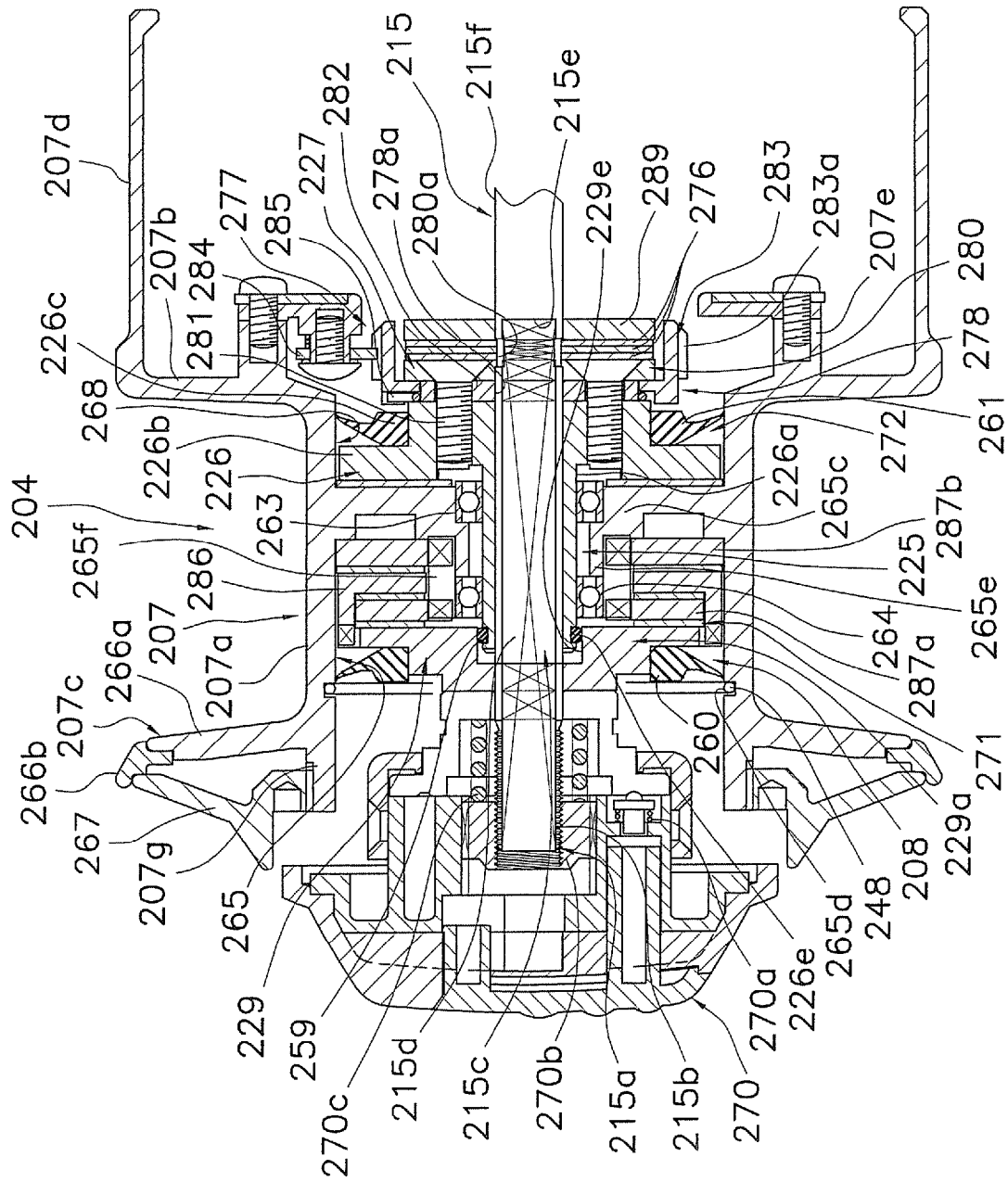
FIG. 9 is an enlarged cross-sectional view of the spool section of the spinning reel.

Referring now to FIGS. 8 and 9, a spool 204 in accordance with a second embodiment will now be explained. In the above described first embodiment, the present invention is explained by exemplifying the spool 4 that is mounted to the rear flange portion 7c, and the drag mechanism 8 including the first and second friction portions 71 and 72. In the second embodiment, however, as illustrated in FIGS. 8 and 9, first and second friction portions 271 and 272 of a drag mechanism 208 are accommodated in the interior of a bobbin trunk 207a of spool 204.

As illustrated in FIG. 8, the spool 204 is disposed between a first rotor arm 31 and a second rotor arm 32 of a rotor 3. The spool 204 is configured to be detachably mounted to a spool shaft 215 that is disposed along the front-to-rear direction.

As illustrated in FIG. 9, the spool shaft 215 is formed to have a diameter that is reduced toward the tip thereof in one phase. A male threaded portion 215b for drag regulation is formed on the outer peripheral surface of the tip side portion of a first shaft portion 215a. A second shaft portion 215c, which is formed adjacent to the first shaft portion 215a, is formed with a diameter slightly greater than that of the first shaft portion 215a. An anti-rotation portion 215d is formed on the outer peripheral surface of the first shaft portion 215a and that of the second shaft portion 215c, and includes surfaces that are disposed in parallel with each other. The anti-rotation portion 215d is formed for non-rotatably coupling a member(s) (to be described later) of a drag mechanism 208 to the spool shaft 215. A third shaft portion 215f, which is formed on the base end side (right side in FIG. 9) of the spool shaft 215, is formed with a diameter that is the same as that of the second shaft portion 215c. However, the anti-rotation portion 215d is not formed therein. Therefore, a step 215e is formed between the second shaft portion 215c and the third shaft portion 215f. In other words, the step 215e is formed in the rear end portion of the anti-rotation portion 215d.

As illustrated in FIG. 9, the spool 204 includes a tubular shaped support member 225, a spool body 207 for winding fishing line, and a drag mechanism 208 for braking the spool body 207. The support member 225 is non-rotatably and detachably mounted to the spool shaft 215. The spool body 207 includes first and second housing recesses 265 and 268 that are substantially-circularly opened forward and backward, respectively. In addition, the spool 204 includes first and second sealing members 259 and 260 for preventing liquid from entering the first housing recess 265. The drag mechanism 208 is accommodated in the first housing recess 265. A fifth sealing member 261 is provided for preventing liquid from entering the second housing recess 268.

Figure 10:
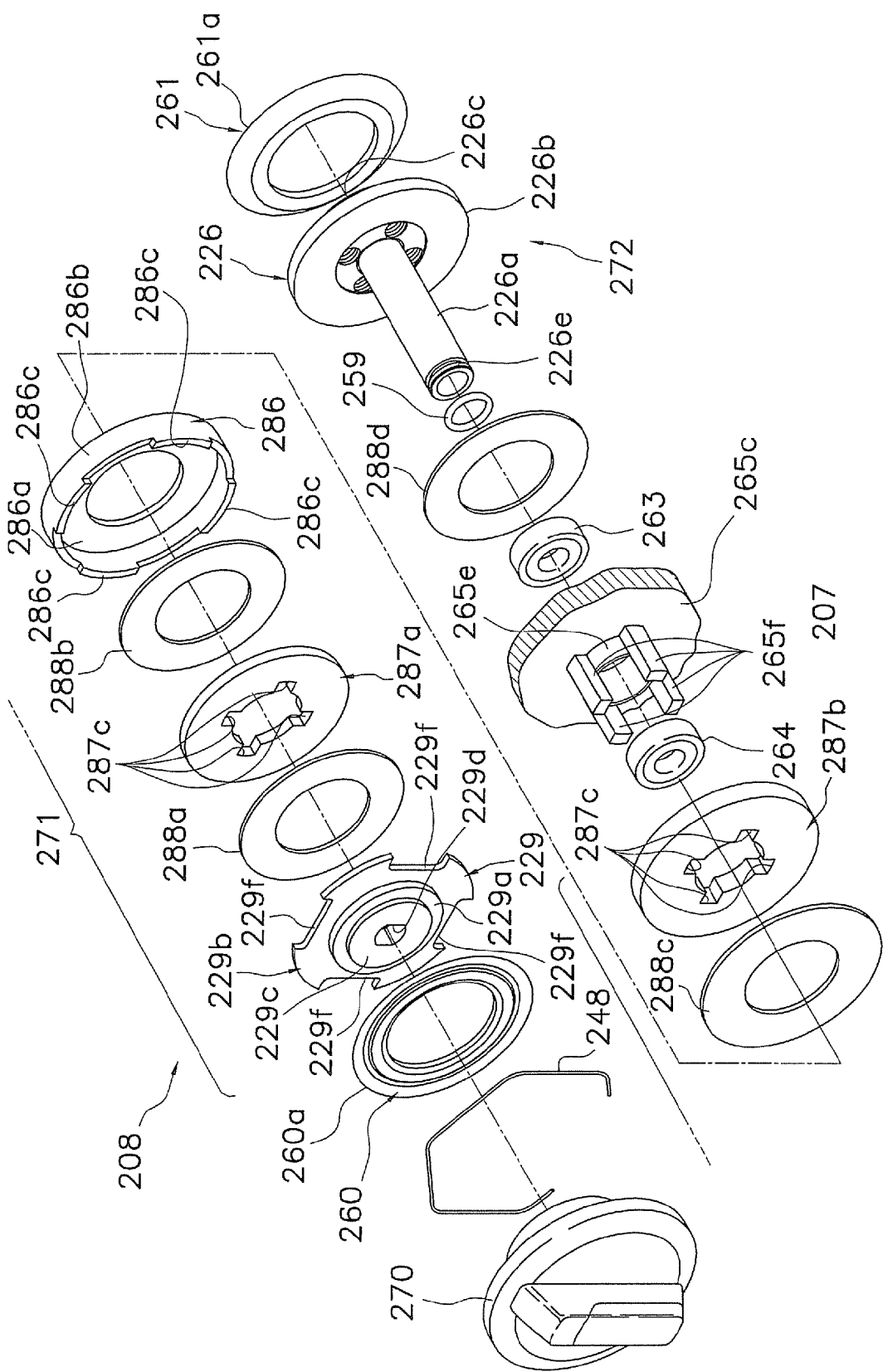
FIG. 10 is an exploded oblique view of a drag mechanism.

The support member 225 includes a tubular shaped support member main body 226, and a restriction part 227 that restricts rearward movement of the support body 226 and also restricts the support body 226 non-rotatably with respect to the spool shaft 215. As illustrated in FIGS. 9 and 10, the support member main body 226 includes a tubular shaped bearing mount portion 226a that first and second bearings 263 and 264 for rotatably supporting the spool body 207 are mounted thereto, and a disk shaped washer part (example of rear drag washer) 226b that is provided on the outer peripheral surface of the rear part thereof and forms a second friction portion (example of rear friction portion) 272 (to be described later) of the drag mechanism 208.

The support body 226 is rotatably and axially-movably mounted to the spool shaft 215. An annular shaped sealing member mount groove 226e is formed in the tip of the bearing mount portion 226a of the support body 226. The first sealing member 259 is mounted to the sealing member mount groove 226e. The first sealing member 259 is, for instance, an O-ring and seals a gap created between the support body 226 and a press washer 229 (to be described later) of the drag mechanism 208. A sealing member mount portion 226c is formed on the rear surface of the washer part 226b of the support body 226 and is formed with a diameter less than that of the washer part 226b. The fifth sealing member 261 is mounted to the sealing member mount portion 226c. The fifth sealing member 261 is formed in almost the same shape as a second sealing member 260 (to be described later). For example, the fifth sealing member 261 is a washer shaped member that is made of elastic material such as nitrile rubber and urethane rubber. The fifth sealing member 261 includes a tapered lip 261a, which is sloped rearward, on the tip of the outer peripheral side thereof. The base end of the inner peripheral side of the fifth sealing member 261 is mounted to the outer peripheral surface of the sealing member mount portion 226c, and the lip 261a makes contact with the inner peripheral surface of the second housing recess 268. Because of this, the fifth sealing member 261 seals a gap created between the outer peripheral surface of the sealing member mount portion 226c of the support body 226 and the second housing recess 268.

As illustrated in FIG. 9, a restriction part 227 includes a sound generation disk 278 that is fixed on the rear surface of the support body 226, and a restriction disk 280. The sound generation disk 278 forms a drag sound generation mechanism 277 (to be described later). The sound generation disk 278 and the restriction disk 280 include substantially-rectangular shaped through holes 278a and 280a, respectively, on the center part thereof. The through holes 278a and 280a are non-rotatably interlocked with the anti-rotation portion 215d of the spool shaft 215. The disks 278 and 280 are fixed to the support body 226 by four flat head bolts 281 that penetrate from behind the restriction disk 280. The four flat head bolts 281 are screwed into the rear surface of the support body 226. As a result, the support body 226 is configured to be non-rotatable with respect to the spool shaft 215.

In addition, three regulation washers 276 make contact with the rear end surface of the restriction disk 280. The three regulation washers 276 are made of synthetic resin and are mounted to the rear end part of the anti-rotation portion 215d of the spool shaft 215. The regulation washers 276 serve to regulate the front-to-rear position of the spool 4 in the spool shaft direction. A spool washer 289 is mounted to the rear surface of the regulation washer 276 for regulating rearward movement of the spool body 207. The spool washer 289 is non-rotatably locked in the rearmost part of the anti-rotation portion 215d. The spool washer 289 makes contact with the step 215e of the spool shaft 215 and is configured to be non-movable in the axially rearward direction. Because of this, rearward movement of the support body 226 in the spool shaft direction is restricted. Note that a rear end part of the anti-rotation portion 215d on which the regulation washers 276 are mounted is formed with a diameter slightly less than that of the other part, and the regulation washers 276 are configured to be left on the spool shaft 215 when the spool body 207 is removed together with the support member 225 from the spool shaft 215.

The spool body 207 is a cylindrical member with two (higher and lower) levels, which, for instance, is formed by forging an aluminum alloy or the like. The spool body 207 is a member for winding fishing line thereon, and is rotatably mounted to the support member 225 while rearward movement is restricted. The spool body 207 includes a substantially tubular shaped bobbin trunk 207a, front and rear flange portions 207b and 207c, and a tubular shaped skirt portion 207d.

The fishing line is allowed to be wound on the outer peripheral surface of the bobbin trunk 207a. The front and rear flange portions 207b and 207c have large diameters and are provided on the front and rear of the bobbin trunk 207a. The skirt portion 207d extends rearward from the rear flange portion 207c.

The bobbin trunk 207a is rotatably supported by the support body 226 through the first and second bearings 263 and 264. The first bearing 263 and the second bearing 264 are disposed on the outer peripheral surface of the bearing mount portion 226a of the support body 226 to be aligned at a predetermined interval in the spool shaft direction. The second bearing 264 is disposed on the front of the first bearing 263.

A tubular shaped first housing recess 265 is formed in the interior of the front part of the bobbin trunk 207a, and includes a substantially circular opening for accommodating the first friction portion 271 of the drag mechanism 208. The inner peripheral surface of the first housing recess 265 is formed to have a cylindrical smooth surface. An annular groove 265d is formed in the tip of the first housing recess 265. A retaining member 248 is mounted to the annular groove 265d. The retaining member 248 holds the second sealing member 260 and the first friction portion 271 together. The retaining member 248 is formed by bending an elastic metal wire into a polygonal shape.

A tubular shaped second housing recess 268 is formed in the interior of the rear part of the bobbin trunk 207a for accommodating the second friction portion 272 of the drag mechanism 208. The second housing recess 268 includes a substantially circular opening. A partition portion 265c is formed between the first housing recess 265 and the second housing recess 268. An inner tubular portion 265e that protrudes forward is formed on the inner peripheral side of the partition portion 265c. Four anti-rotation portions 265f are formed on the outer peripheral surface of the inner tubular portion 265e. The anti-rotation portions 265f are circumferentially disposed at predetermined intervals and are formed to protrude in the diameter direction. The anti-rotation portions 265f are formed in a rod shape with approximately rectangular cross-section. The anti-rotation portions 265f are formed to protrude forward from the inner tubular portion 265e. The inner peripheral surface and the outer peripheral surface thereof are formed in a coaxially circular-arc shape. The second bearing 264 is mounted to the inner peripheral surface of the anti-rotation portions 265f. A position of an outer ring of the second bearing 64 is defined by the front end surface of the inner tubular portion 265e. A position of an outer ring of the first bearing 263 is defined by a step formed on the inner peripheral surface of the partition portion 265c.

The front flange portion 207b includes an inner flange portion 266a and an annular shaped outer flange portion 266b. The inner flange portion 266a is integrally formed with the bobbin trunk 207a. The outer flange portion 266b is made of hard material such as hard ceramic and is mounted to the outer periphery of the inner flange portion 266a. The outer flange portion 266b is provided for preventing damage and/or abrasion generated by making contact with the fishing line released from the spool 204. The outer flange portion 266b is fixed to the inner flange portion 266a by a flange fixing member 267 that is screwed into and fixed to the outer peripheral surface of a tubular shaped fixing portion 207g that protrudes forward from the bobbin trunk 207a.

The rear flange portion 207c is integrally formed with the bobbin trunk 207a so as to be formed to with a diameter slightly greater than that of the front flange portion 207b. An annular shaped protrusion 207e is formed on the rear surface of the rear flange portion 207c. A drag sound generation mechanism 277 mentioned heretofore is mounted to the annular shaped protrusion 207e.

The skirt portion 207d is tubular shape and integrally formed with the rear flange portion 207c. The skirt portion 207d extends rearward from the outer periphery of the rear flange portion 207c. When the extended tip moves to the proceeding end of the spool 204, it is configured to be disposed in a position slightly overlaps the tip of the cylindrical portion 30 of the rotor 3.

The drag mechanism 208 is mounted between the spool body 207 and the spool shaft 215 for applying the drag force to the spool 204 and. The drag force applied by the drag mechanism 8 is regulated by means of a drag regulation member 270 disposed in the tip of the spool shaft 215 in order to manually regulating the drag force. The drag mechanism 208 includes the first friction portion 271 and the second friction portion 272. The first friction portion 271 is pressed by the drag regulation member 270, and the second friction portion 272 is accommodated in the second housing recess 268.

As illustrated in FIG. 9, the drag regulation member 270 includes a drag regulation sound generation mechanism 270a, a nut 270b, and a coil spring 270c in the interior thereof. The drag regulation sound generation mechanism 270a generates a sound during drag regulation. The nut 270b is screwed onto the male threaded portion 215b formed in the tip of the spool shaft 15. The coil spring 270c increases/decreases the drag force. The drag regulation member 270 reciprocates the nut 270b with respect to the spool 215 when the drag regulation member 270 is rotatably moved with respect to the spool shaft 215. When the nut 270b is moved, the coil spring 270c is extended/contracted. Accordingly, the pressing force applied to the first friction portion 271 and the second friction portion 272 is changed, and the drag force is regulated.

As illustrated in FIGS. 9 and 10, the first friction portion 271 includes a press washer 229, a single or plurality of (e.g., one) first drag washer(s) 286, and a single or plurality of (e.g., two) second drag washers 287a and 287b. The press washer is non-rotatably mounted to the spool shaft 15. The first drag washer(s) 286 is/are made of stainless ally, for instance, and is/are non-rotatable with respect to the press washer 229. The second drag washers 287a and 287b is/are integrally rotatable with respect to the bobbin trunk 207a.

As illustrated in FIGS. 9 and 10, the press washer 229 is disposed between the second drag washer 287a and the drag regulation member 270. The press washer 229 makes contact with the drag regulation member 270. The press washer 229 includes an opposing tubular portion 229a (FIG. 9) and a brim portion 229b with a large diameter. The opposing tubular portion 229a includes an inner peripheral surface 229e that is arranged opposed to the sealing member mount part, which is disposed on the outer peripheral surface of the front part of the support body 226. A brim portion 229b is disposed on the rear part and makes contact with the second drag washer 287a. A press portion 229c is formed on the front end part of the opposing tubular portion 229a. The press portion 229c makes contact with the rear surface of the drag regulation member 270 and is pressed thereby. An elongated hole 229d is formed in the inner peripheral surface of the press portion 229c. The elongated hole 229d is engaged with the anti-rotation portion 215d of the spool shaft 215. Because of this, the press washer 229 is non-rotatably and axially-movably mounted to the spool shaft 215. A plurality of (e.g., four) anti-rotation recesses 229f are formed on the outer peripheral surface of the brim portion 229b, and the first drag washer 286 is non-rotatably coupled thereto. The second sealing member 260 is mounted to the outer peripheral surface of the opposing tubular portion 229a.

For example, the second sealing member 260 is a washer shaped member that is made of elastic material such as nitrile rubber and urethane rubber. The second sealing member 260 includes a tapered lip 260a on the tip of the outer peripheral side thereof. The second sealing member 260 is formed so as to slope forward. The base end of the inner peripheral side of the second sealing member 260 is mounted to the outer peripheral surface of the opposing tubular portion 229a. The lip 260a makes contact with the inner peripheral surface of the first housing recess 265. Because of this, the second sealing member 260 seals a gap created between the outer peripheral surface of the opposing tubular portion 229a and the first housing recess 265. As described above, the second sealing member 260 and the first friction portion 271 are held together by the retaining member 248.

The inner peripheral surface of the opposing tubular portion 229a, excluding the press portion 229c, is formed with a diameter greater than that of the elongated hole 229d. The inner peripheral surface is arranged to be opposed to the sealing member mount part of the support member main body 226. The inner peripheral surface thereof is allowed to make contact with the first sealing member 259. Because of this, the first sealing member 259 seals a gap created between the support body 226 of the support member 225 and the outer peripheral surface of the opposing tubular portion 229a.

First drag washer 286 and second drag washers 287a, and 287b correspond to a front drag washer and are pressed by a press washer 229. The second drag washers 287a and 287b and the first drag washer 286 are alternately disposed to each other. Three drag disks 288a, 288b, and 288c are mounted between the press washer 229 and the second washer 287b. The three drag disks 288a, 288b, and 288c are made of carbon graphite.

The first drag washer 286 includes a disk shaped washer portion 286a that is disposed between two second drag washers 287a and 287b, and an outer tubular portion 286b that protrudes forward from the outer peripheral part of the washer portion 286a. An anti-rotation protrusion 286c, which is engaged with the anti-rotation recess 229f of the press washer 229, is formed in the tip of the outer tubular portion 286b. A plurality of (e.g., four) anti-rotation protrusions 286c are circumferentially disposed at predetermined intervals and are formed to protrude forward from the tip of the outer tubular portion 286b so as to be allowed to mesh with the anti-rotation recess 229f. The first drag washer 286 is configured to be non-rotatable with respect to the spool shaft 215 through the press washer 229, when the anti-rotation protrusions 286c are engaged and meshed with the anti-rotation recess 229f.

The second drag washer 287a is accommodated in the inner peripheral side of the outer tubular portion 286b of the first drag washer 286 together with the two drag disks 288a and 288b while the second drag washer 287a is interposed between the two drag disks 288a and 288b. The second drag washer 287b is disposed on the rear surface (right lateral surface in FIG. 10) of the washer portion 286a of the first drag washer 286 so as to make contact with the rear surface through the drag disk 288c. Therefore, the second drag washer 287b is formed to have a diameter greater than that of the second drag washer 287a, and the drag disk 288c is formed to have a diameter greater than that of the drag disks 288a and 288b.

An anti-rotation recess 287c is formed on the inner peripheral surface of the second drag washers 287a and 287b and is interlocked with the anti-rotation portion 265f that is formed on the outer peripheral surface of the inner tubular portion 265e of the bobbin trunk 207a. A plurality of (e.g., four) anti-rotation recesses 287c are circumferentially formed on the inner peripheral surface of the second drag washers 287a and 287b at predetermined intervals so as to be allowed to mesh with the anti-rotation portion 265f. Because of this, the second drag washers 287a and 287b are configured to be non-rotatable with respect to the spool body 207 and are also configured to be rotatable with respect to the spool shaft 215. The second drag washer 287a is made of stainless alloy. The second drag washer 287b is formed, for instance, by processing carbon cloth and is allowed to make contact with the front surface of the partition portion 265c and presses the spool body 207 rearward.

The second friction portion 272 includes a washer portion 226b of the support member main body 226 that is non-rotatable with respect to the spool shaft 215. A drag disk 288d is disposed between the washer portion 226b and the rear surface of the partition portion 265c, and the washer portion 226b is allowed to make contact with the partition portion 265c through the drag disk 288d. The washer portion 226b corresponds to a rear drag washer, and is pressed by the press washer 229 through the spool body 207. In addition, the second friction portion 272 is restricted to move rearward in the spool shaft direction by the restriction part 227.

As illustrated in FIG. 9, the drag sound generation mechanism 277 is disposed on the rear surface of the support member main body 226 for generating a sound during a drag operation. The drag sound generation mechanism 277 includes the above described sound generation disk 278 and a hitting pawl 284 that is pivotably mounted to the rear surface of the rear flange portion 207b of the spool body 207.

The sound generating disk 278 includes an inner member 282 that is integrally rotatable with the spool shaft 215, an outer member 283 that is rotatably mounted to the inner member 282, and a spring member 285 for frictionally engaging the outer member 283 with the inner member 282. Serrated ratchet teeth 283a are formed on the outer peripheral surface of the outer member 283 and are configured to mesh with the hitting pawl 284 when the spool 204 rotates in the line-winding direction. The serrated ratchet teeth 283a are configured not to mesh with the hitting pawl 284 when the spool 204 rotates, for instance, in the line-releasing direction during drag operation. Because of this, when the spool 204 rotates in the line-winding direction, the outer member 283 rotates with respect to the inner member 282, and the drag sound generation mechanism 277 does not generate a sound. However, only when the spool 204 rotates in the line-releasing direction, the outer member 283 does not rotate with respect to the inner member 282 and the hitting pawl 284 repeatedly hits the ratchet teeth 283a. Thus a sound is generated.

Manipulation and operation of the reel is almost the same as the first embodiment. Therefore, explanation thereof will be hereinafter omitted.

As described above, the second friction portion 272 is sealed by the fifth sealing member 261, and the first friction portion 271 is sealed by the first and second sealing members 259 and 260. Therefore, even when the spool body 207 is removed from the spool shaft 215 together with the support member 225, it becomes difficult for liquid to enter the first friction portion 271 and the second friction portion 272 as is the case with the first embodiment. Because of this, when the spool 204 is removed to be cleaned with water, the drag force is not easily varied, even though the spool 204 is in a wet condition.

In addition, according to the spool 204 of the second embodiment, no protrusion is formed on the outer periphery of the second drag washers 287a and 287b that integrally rotate with the spool body 207. Furthermore, the first drag washer 286, which is non-rotatable with respect to the spool shaft 215, is non-rotatably coupled to the spool shaft 215 through the press washer 229 on the outer peripheral side of the second drag washer 287a. Because of this, it is not necessary to provide an anti-rotation groove, which has been conventionally used, on the inner peripheral surface of the first housing recess 265 in which the first friction portion 271 is accommodated. It is possible to form the inner peripheral surface of the first housing recess 265 in a shape without a concavo-convex. As a result, it is possible to set the effective diameter of the drag washer to be large, which contributes to the drag force. In addition, it is easy to dispose the sealing member because there is no concavo-convex on the inner peripheral surface. Also, in a condition that the same amount of drag force is generated, it is possible to set the diameter of the spool to be small. It is also possible to produce a lightweight spool.

Modified Example of Second Embodiment

According to the second embodiment, the first friction portion 271 of the drag mechanism 208 is made up of four drag washers: the press washer 229, the first drag washer 286, and the second drag washers 287a and 287b. The second friction portion 272 is made up of the single washer portion 226b of the support body 226. However, the present invention is not limited to this.

Note that a configuration of the modified example, which is almost the same as that of the second embodiment, will be omitted in the following explanation.

Figure 11:
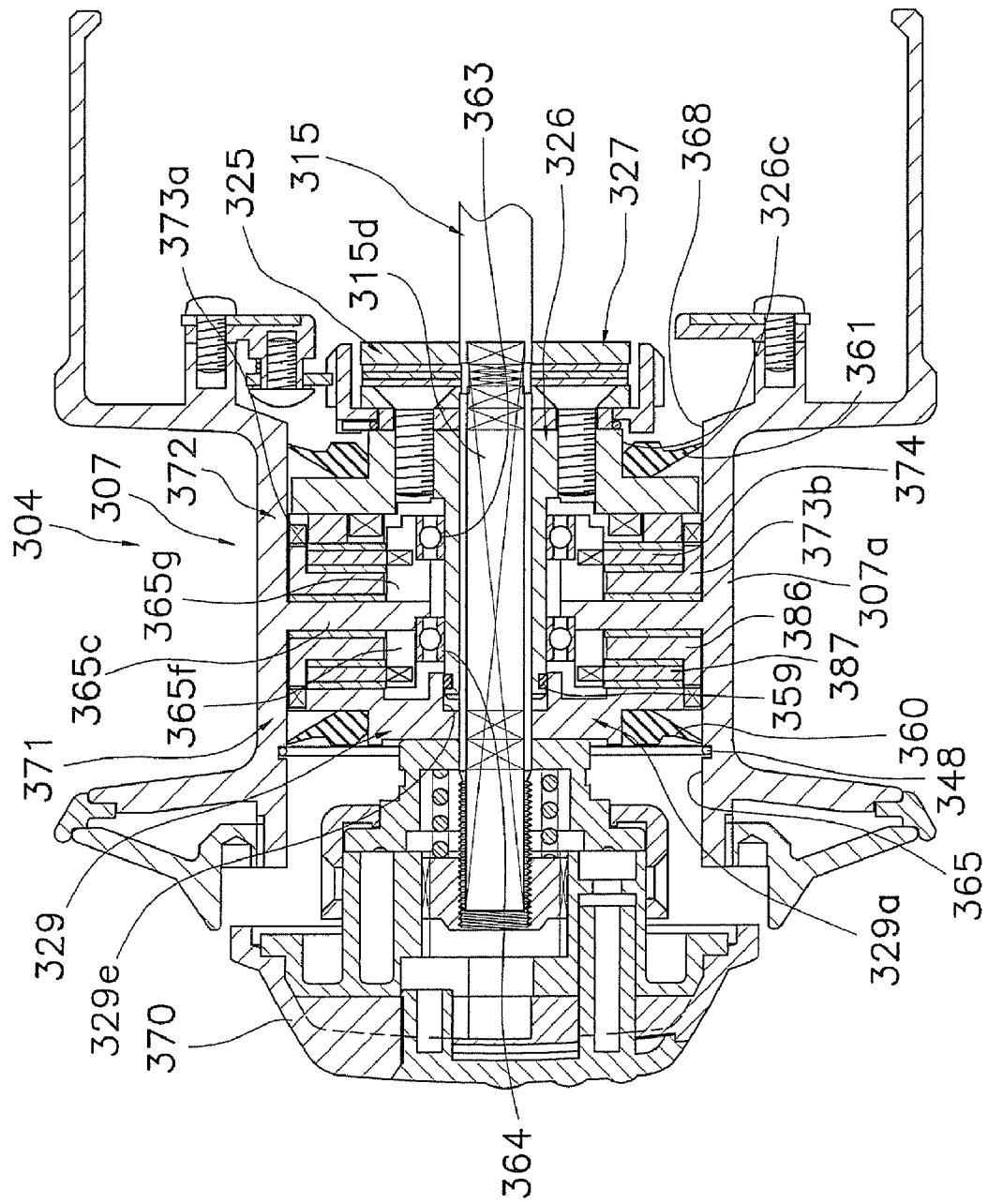
FIG. 11 is a view of a modified example of the second embodiment, which corresponds to FIG. 9.
Figure 12:
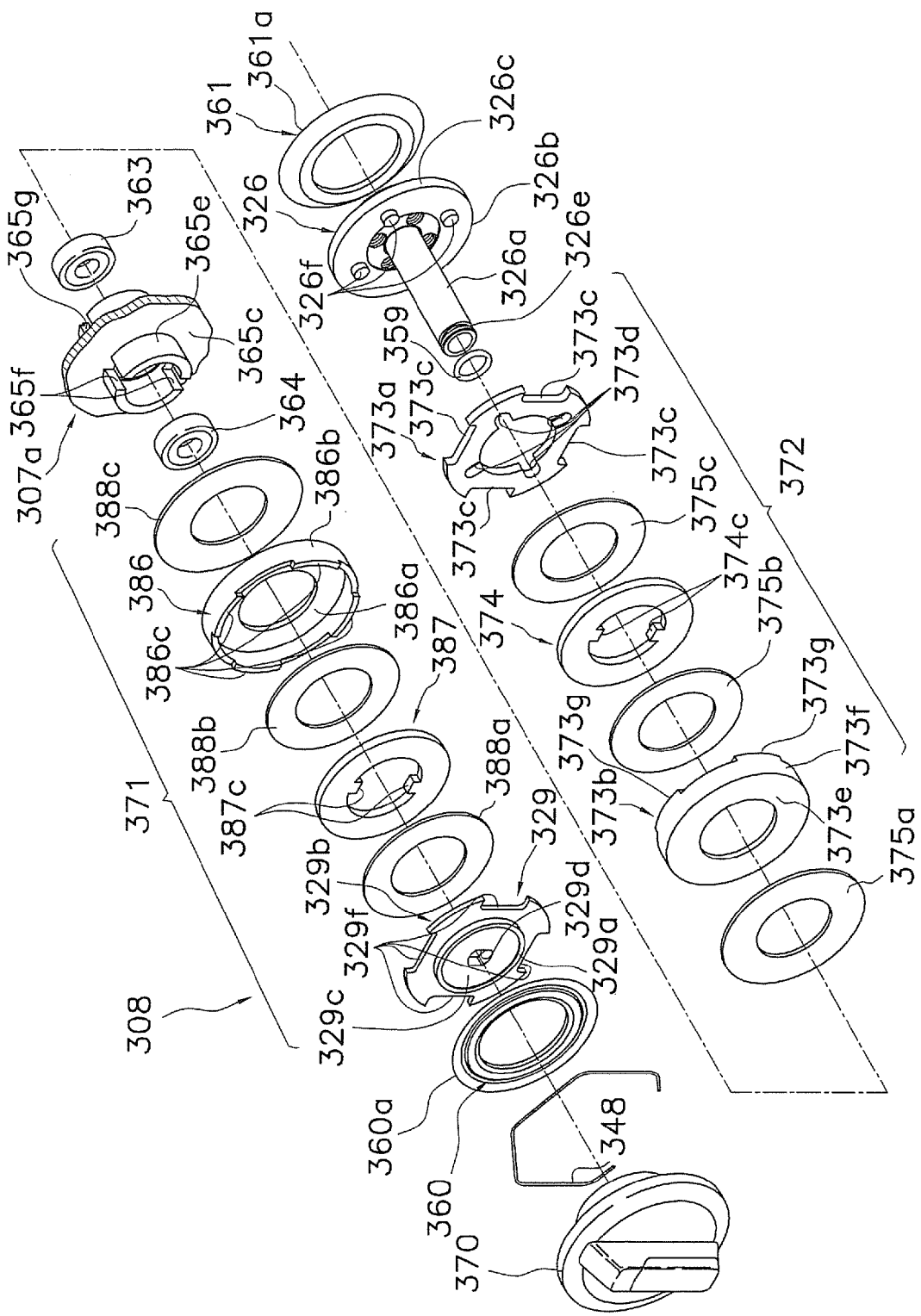
FIG. 12 is a view of a modified example of the second embodiment, which corresponds to FIG. 10.

As illustrated in FIGS. 11 and 12, an inner tubular portion 365e is formed on the inner peripheral side of a partition portion 365c of a bobbin trunk 307a of a spool body 307, and protrudes forward and rearward. Anti-rotation grooves 365f and 365g are formed on the front part and the rear part of the inner tubular portion 365e along the diameter direction so as to penetrate through the inner and outer peripheral surfaces. The anti-rotation grooves 365f and 365g are formed for preventing rotation of first and second friction portions 371 and 372 to be described.

As illustrated in FIG. 11, a support member 325 includes a tubular shaped support member main body 326 and a restriction part 327 that restricts rearward movement of the support body 326 and non-rotatably restricts the support body 326 with respect to a spool shaft 315. As illustrated in FIGS. 11 and 12, the support body 326 includes a tubular shaped bearing mount portion 326a to which first and second bearings 363 and 364 for rotatably supporting the spool body 307 are mounted, and a disk shaped disk portion 326b that is formed on the rear outer peripheral surface and restricts rearward movement of a second friction portion (example of a rear friction portion) (to be described later) of a drag mechanism 308.

In the modified example, the disk portion 326b does not form the second friction portion 372. The support body 326 is rotatably and axially-movably mounted to the spool shaft 315. An annular shaped sealing member mount groove 326e is formed in the tip of the bearing mount portion 326a of the support body 326. A first sealing member 359 is mounted to the sealing member mount groove 326e. The first sealing member 359 is, for instance, an O-ring for sealing a gap between the support body 326 and a press washer 329 (to be described later) of the drag mechanism 308.

A sealing member mount portion 326c is formed on the rear surface of the disk portion 326b of the support body 326 and is formed to have a diameter less than that of the disk portion 326b. A fifth sealing member 361 is mounted to the sealing member mount portion 326c. The fifth sealing member 361 is formed in almost the same shape as a second sealing member 360 (to be described later) and is a washer shaped member, for instance, which is made of elastic material such as nitrile rubber and urethane rubber. The fifth sealing member 361 includes a tapered lip 361a on the tip of the outer peripheral side. The tapered lip 361a is sloped rearward. The base end of the inner peripheral side of the fifth sealing member 361 is mounted on the outer peripheral surface of the sealing member mount portion 326c, and the tapered lip 361a makes contact with the inner peripheral surface of a second housing recess 368. Because of this, the fifth sealing member 361 seals a gap created between the outer peripheral surface of the sealing member mount portion 326c of the support body 326 and the second housing recess 368.

A plurality of (e.g., four) anti-rotation protrusions 326f are circumferentially disposed on the front surface of the disk portion 326b at predetermined intervals for preventing rotation of the second friction portion 372. The anti-rotation protrusions 326f are formed to protrude forward. The anti-rotation protrusions 326f are engaged with a third drag washer 373 (to be described later) of the second friction portion 372, and non-rotatably couples a third drag washer 373a with respect to the spool shaft 315.

The first friction portion 371 of the drag mechanism 308 includes the press washer 329, a single or plurality of (e.g., one) first drag washer(s) 386, and a single or plurality of (e.g., one) second drag washer(s) 387. The press washer 329 is non-rotatably mounted to the spool shaft 315. The first drag washer(s) 386 is/are made of, for instance, stainless alloy and is/are non-rotatable with respect to the press washer 329. The second drag washer(s) 387 is/are non-rotatable with respect to the bobbin trunk 307a.

The press washer 329 is disposed between the second drag washer 387 and a drag regulation member 370 and makes contact with the drag regulation member 370. The press washer 329 includes an opposing tubular portion 329a and a brim portion 329b with large a diameter. The opposing tubular portion 329a includes an inner peripheral surface 329e that is arranged opposed to a sealing member mount part provided on the front outer peripheral surface of the support body 326. The brim portion 329b is disposed on the rear part and makes contact with the second drag washer 387. A press portion 329c is formed in the front end part of the opposing tubular portion 329a and makes contact with the rear surface of the drag regulation member 370 and is pressed thereby. In addition, an elongated hole 329d is formed on the inner peripheral surface of the press portion 329c and is engaged with an anti-rotation portion 315d of the spool shaft 315. Because of this, the press washer 329 is non-rotatably and axially-movably mounted to the spool shaft 315. A plurality of (e.g., four) anti-rotation recesses 329f are formed on the outer peripheral surface of the brim portion 329b, and the first drag washer 386 is non-rotatably coupled to the anti-rotation recesses 329f. A second sealing member 360 is mounted to the outer peripheral surface of the opposing tubular portion 329a.

For example, the second sealing member 360 is a washer shaped member that is made of elastic material such as nitrile rubber and urethane rubber, and includes a tapered lip 360a, which is sloped forward, on the tip of the outer peripheral side. The base end of the inner peripheral side of the second sealing member 360 is mounted to the outer peripheral surface of the opposing tubular portion 329a, and the lip 360a makes contact with the inner peripheral surface of a first housing recess 365. Because of this, the second sealing member 360 seals a gap generated between the outer peripheral surface of the opposing tubular portion 229a and the first housing recess 365. The second sealing member 360 and the first friction portion 371 are retained together by a retaining member 348.

The inner peripheral surface of the opposing tubular portion 329a, excluding the press portion 329c, is formed to have a diameter greater than that of the elongated hole 329d and is arranged opposed to a sealing member mount part of the support body 326. The inner peripheral surface thereof is allowed to make contact with the first sealing member 359. Because of this, the first sealing member 359 seals a gap created between the support body 326 of the support member 325 and the outer peripheral surface of the opposing tubular portion 329a.

The first and second drag washers 386 and 387 correspond to a front drag washer and are pressed by the press washer 329. The second drag washer 387 is disposed on the front of the first drag washer 386, and the three drag disks 388a, 388b, and 388c that are made of carbon graphite are mounted between the press washer 329 and the partition portion 365c. The drag disk 388c is formed to have a diameter greater than that of the drag disks 388a and 388b.

The first drag washer 386 includes a disk shaped washer portion 386a and an outer tubular portion 386b. The washer portion 386a is disposed between the second drag washer 387 and the partition portion 365c of the spool body 307. The outer tubular portion 386b protrudes forward from the outer periphery of the washer portion 386a. An anti-rotation protrusion 386c is formed in the tip of the outer tubular portion 386b and is engaged with the anti-rotation recess 329f of the press washer 329. A plurality of (e.g., four) anti-rotation protrusions 386c are circumferentially disposed at predetermined intervals. The anti-rotation protrusions 386c are formed to protrude forward from the tip of the outer tubular portion 386b so as to be allowed to mesh with the anti-rotation recess 329f. When the anti-rotation protrusions 386c are meshed and engaged with the anti-rotation recess 329f, the first drag washer 386 is non-rotatably coupled to the spool shaft 315 through the press washer 329. The first drag washer 386 is allowed to make contact with the front surface of the partition portion 365c through the drag disk 388c and presses the spool body 307 rearward.

The second drag washer 387 is accommodated in the inner peripheral side of the outer tubular portion 386b of the first drag washer 386 together with two drag disks 388a and 388b while the second drag washer 387 is interposed between the two drag disks 388a and 388b.

Anti-rotation convexes 387c are formed on the inner peripheral surface of the second drag washer 387 and are engaged with the anti-rotation groove 365f of the inner tubular portion 365e. The anti-rotation convexes 387c are formed on the inner peripheral surface of the second drag washer 387 and protrude inward so as to be allowed to mesh with the anti-rotation groove 365f. The anti-rotation convexes 387c are opposed to each other. Because of this, the second drag washer 387 is configured to be non-rotatable with respect to the spool body 307 and rotatable with respect to the spool shaft 315. The second drag washer 387 is made of stainless alloy.

The second friction portion 372 includes a single or a plurality of (e.g., two) third drag washers 373a and 373b that is/are non-rotatable with respect to the spool shaft 315, and a single or a plurality of (e.g., one) fourth drag washer 374 that is integrally rotatable with respect to the bobbin trunk 307a. The third and fourth drag washers 373a, 373b, and 374 correspond to a front drag washer and are pressed by the partition portion 365c. The fourth drag washer 374 is arranged to be interposed between the first drag washers 373a and 373b. The three drag disks 375a-375c made of carbon graphite are mounted between the partition portion 365c and the first drag washer 373a. The drag disk 375a is formed to have a diameter greater than that of the drag disks 375b and 375c.

The third drag washer 373a is a disk shaped member that is opposed to the disk portion 326b of the support member main body 326. A plurality of (e.g., four) anti-rotation recesses 373c, which are formed to be almost the same as the press washer 329, are formed on the outer periphery of the third drag washer 373a. In addition, a plurality of (e.g., four) anti-rotation recesses 373d are formed on the inner periphery thereof, and the anti-rotation recesses 373d are engaged with the anti-rotation protrusion 326f that are formed in the disk portion 326b of the support body 326. When the anti-rotation recess 373d and the anti-rotation protrusion 326f are engaged with each other, the third drag washer 373a is non-rotatably coupled to the spool shaft 315 through the support body 326.

The third drag washer 373b is formed in a reversed shape of the first drag washer 386, and the shape is substantially the same as that of the drag washer 386. The third drag washer 373a includes a washer portion 373e and an outer tubular portion 373f. The washer portion 373e is disposed between the partition portion 365c and a fourth drag washer 374. The outer tubular portion 373f protrudes rearward from the outer periphery of the washer portion 373e. An anti-rotation protrusion 373g is formed in the tip of the outer tubular portion 373f and is engaged with the anti-rotation recess 329c of the press washer 329. A plurality of (e.g., four) anti-rotation protrusions 373g are circumferentially disposed at predetermined intervals and are formed to protrude rearward from the tip of the outer tubular portion 373f so as to be allowed to mesh with the anti-rotation recess 373c. When the anti-rotation protrusions 373g are meshed and engaged with the anti-rotation recesses 373c, the third drag washer 373b is non-rotatably coupled to the spool shaft 315 through the third drag washer 373a. The third drag washer 373b is allowed to make contact with the rear surface of the partition portion 365c through the drag disk 375a and is pressed rearward by the spool body 307.

A fourth drag washer 374 is formed in almost the same shape as the second drag washer 387 and is accommodated in the inner peripheral side of the outer tubular portion 373f of the third drag washer 373b together with two drag disks 375b and 375c. The fourth drag washer 374, at the same time, is interposed between the two drag disks 375b and 375c.

Anti-rotation convexes 374c are formed on the inner peripheral surface of the fourth drag washer 374 and are engaged with the anti-rotation groove 365g of the inner tubular portion 365e. The anti-rotation convexes 374c are formed on the inner peripheral surface of the fourth drag washer 374 and protrude inward so as to be allowed to mesh with the anti-rotation groove 365g The anti-rotation convexes 374c are opposed to each other. Because of this, the fourth drag washer 374 is configured to be non-rotatable with respect to the spool body 307 and is also configured to be rotatable with respect to the spool shaft 315. The fourth drag washer 374 is made of stainless alloy. In addition, rearward movement of the second friction portion 372 in the spool shaft direction is restricted by the restriction part 327.

An operation of the modified example is almost the same as that of the first embodiment. Therefore, explanation thereof will be hereinafter omitted.

With the modified example, it is possible to achieve almost the same effects as those achieved by the second embodiment. In addition, the number of washers of the rear friction portion 372 in the modified example is greater than that of the second embodiment. Therefore, durability of the drag mechanism 308 will be enhanced.

Alternative Embodiment (a) In the above described first and second embodiments, the drag mechanism including the second friction portion is exemplified. However, it is possible to apply the present invention to a spool including a drag mechanism that has only the first friction portion.

(b) In the above described first and second embodiments, the support body of the support member is non-rotatably coupled to the spool shaft through the restriction disk. However, the support body may be non-rotatably coupled to the spool shaft directly.

(c) In the above described second embodiment, the bearing mount portion 226a of the support body 226 and the washer portion 226b are integrally formed. However, the washer portion may be formed separately from the bearing mount portion, and the washer portion and the bearing mount portion may be non-rotatably coupled to each other.

(d) In the above described first and second embodiments, the spool is exemplified, which includes two bearings for smoothly rotating the spool during the drag operation. However, the spool body may be rotatably connected to the support body directly without providing a bearing therein. Needless to say, the support body may be formed with metal or synthetic resin with good slidability, and it may function as a sliding bearing.

It should be noted that the term "configured" as used herein to describe a component, section or part of a device includes hardware that is constructed to carry out the desired function.

Moreover, the terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spool of a spinning reel, the spinning reel configured to reel out fishing line, the spool detachably connected to the spinning reel by a drag regulation member, the drag regulation member coupled to a spool shaft, the spool comprising:
   a tubular support member non-rotatably and detachably connected to the spool shaft;
   a spool body arranged to wind fishing line, the spool body having a first housing recess, the first housing recess is formed with a substantially-circular opening frontward, the spool body is rotatably supported by the support member while rearward movement is restricted;
   a drag mechanism configured to brake the spool body, the drag mechanism including a front friction portion with a press washer, the first housing recess accommodating the front friction portion, the press washer has an inner peripheral surface opposed to an outer peripheral surface of a front portion of the support member and makes contact with the drag regulation member,
   a first sealing member configured to seal a gap generated between the inner peripheral surface of the press washer and the outer peripheral surface of the support member; and
   a second sealing member configured to seal a gap generated between the outer peripheral surface of the press washer and the first housing recess.

2. The spool as set forth in claim 1, wherein the front friction portion further includes a single or plurality of front drag washer(s) configured to be pressed by the press washer.

3. The spool as set forth in claim 1, wherein
   the spool body includes a bobbin trunk, front and rear flange portions, and a skirt portion, the bobbin trunk is rotatably supported by the support member and configured to wind fishing line on an outer peripheral surface thereof, the front and rear flanges are disposed on the front and rear of the bobbin trunk and are formed with large diameters, the skirt portion has a tubular shape that extends rearward from the rear flange portion, and
   the first housing recess is disposed in a front portion of the bobbin trunk.

4. The spool as set forth in claim 3, wherein
   the rear flange portion includes a second housing recess, the second housing recess is formed with a substantially-circular opening rearward, and
   the drag mechanism further including a rear friction portion and a cover member, the rear friction portion comprises a single or plurality of rear drag washer(s), the second housing recess arranged to accommodate the rear friction portion and the single or plurality of rear drag washer(s), the cover member covering the second housing recess from the rear.

5. The spool as set forth in claim 4, further comprising a third sealing member configured to seal a gap generated between the cover member and the support member.

6. The spool as set forth in claim 5, further comprising a fourth sealing member configured to seal a gap generated between the cover member and the second housing recess.

7. The spool as set forth in claim 3, wherein
   the bobbin trunk includes a second housing recess, the second housing recess formed with a substantially-circular opening rearward, and
   the drag mechanism further including a rear friction portion, the rear friction portion has a single or plurality of rear drag washer(s), the second housing recess arranged to accommodate the rear drag washer(s).

8. The spool of claim 7, further comprising a fifth sealing member configured to seal a gap generated between the rear drag washer(s) and the second housing recess.

9. The spool as set forth in anyone of claim 1, wherein
   the spool body is rotatably supported by the support member by means of at least one bearing connected to the outer peripheral surface of the press washer.

10. The spool as set forth in claim 9, further comprising a retaining member that retains the second sealing member, the second sealing member is disposed on the front surface of the bearing.

11. The spool as set forth in claim 10, wherein
    the first housing recess includes a bearing support portion with the bearing attached thereto.

12. The spool as set forth in claim 10, further comprising a first drag housing portion formed with a diameter less than that of the bearing support portion, the first drag housing portion arranged to accommodate the front friction portion.

13. A spinning reel comprising:
    a reel unit;
    a rotor rotatably supported on the reel unit;
    a spool shaft; and
    a spool movably mounted along on the spool shaft, the spool including
      a tubular support member non-rotatably and detachably connected to the spool shaft;
      a spool body configured to wind fishing line, the spool body having a first housing recess, the first housing recess is formed with a substantially-circular opening frontward, the spool body is rotatably supported by the support member while rearward movement is restricted;
      a drag mechanism configured to brake the spool body, the drag mechanism including a front friction portion with a press washer, the first housing recess accommodating the front friction portion, the press washer has an inner peripheral surface opposed to an outer peripheral surface of a front portion of the support member and makes contact with a drag regulation member,
      a first sealing member arranged to seal a gap generated between the inner peripheral surface of the press washer and the outer peripheral surface of the support member; and
      a second sealing member arranged to seal a gap generated between the outer peripheral surface of the press washer and the first housing recess.

* * * * *